United States Patent [19]

Giallanza et al.

[11] 4,383,257

[45] May 10, 1983

[54] MESSAGE COMMUNICATION SYSTEM WITH MESSAGE STORAGE

[75] Inventors: Frank V. Giallanza, San Jose; Don M. Tracey, Mountain View; Wayne T. Holcombe, Palo Alto, all of Calif.

[73] Assignee: Millicom Incorporated, Melville, N.Y.

[21] Appl. No.: 215,921

[22] Filed: Dec. 12, 1980

Related U.S. Application Data

[63] Continuation-in-part of Ser. No. 106,713, Dec. 26, 1979.

[51] Int. Cl.³ .............................................. G08B 5/22
[52] U.S. Cl. ........................... 340/825.47; 340/825.44; 455/31; 455/38
[58] Field of Search .................... 340/825.44, 825.45, 340/825.47, 825.71, 825.72, 825.48; 371/49–51, 371/58; 455/31, 32, 38, 68, 70; 179/2 EC

[56] References Cited

U.S. PATENT DOCUMENTS 3,772,596 11/1973 Edwards ............................... 455/38
4,069,477 1/1978 Maben ............................ 340/825.48
4,110,743 8/1978 Zahnd ............................. 340/825.47
4,181,893 1/1980 Ehmke ........................... 340/825.44

Primary Examiner—James J. Groody
Attorney, Agent, or Firm—Fitch, Even, Tabin & Flannery

[57] ABSTRACT

A transmission system develops a binary encoded data train having a message and a header preceding the message. The data train is applied to a carrier frequency to modulate the carrier using FSK techniques. The header includes synch signals, one or more address signals, a message length signal and control signals separating the above signals. One or more personal receivers receive the message if responsive to one of the address signals in the header. An address signal may address a unique personal receiver, a selected group of or all such personal receivers. Each receiver is sequentially activated and deactivated, being activated to detect a synch signal. If synch signals are detected, the receiver remains activated to determine if an address signal identifies such receiver to receive the message. A received message is stored digitally in a number of storage locations determined by the message length signal and may be selectively displayed in alphanumeric characters when convenient for the recipient.

65 Claims, 10 Drawing Figures

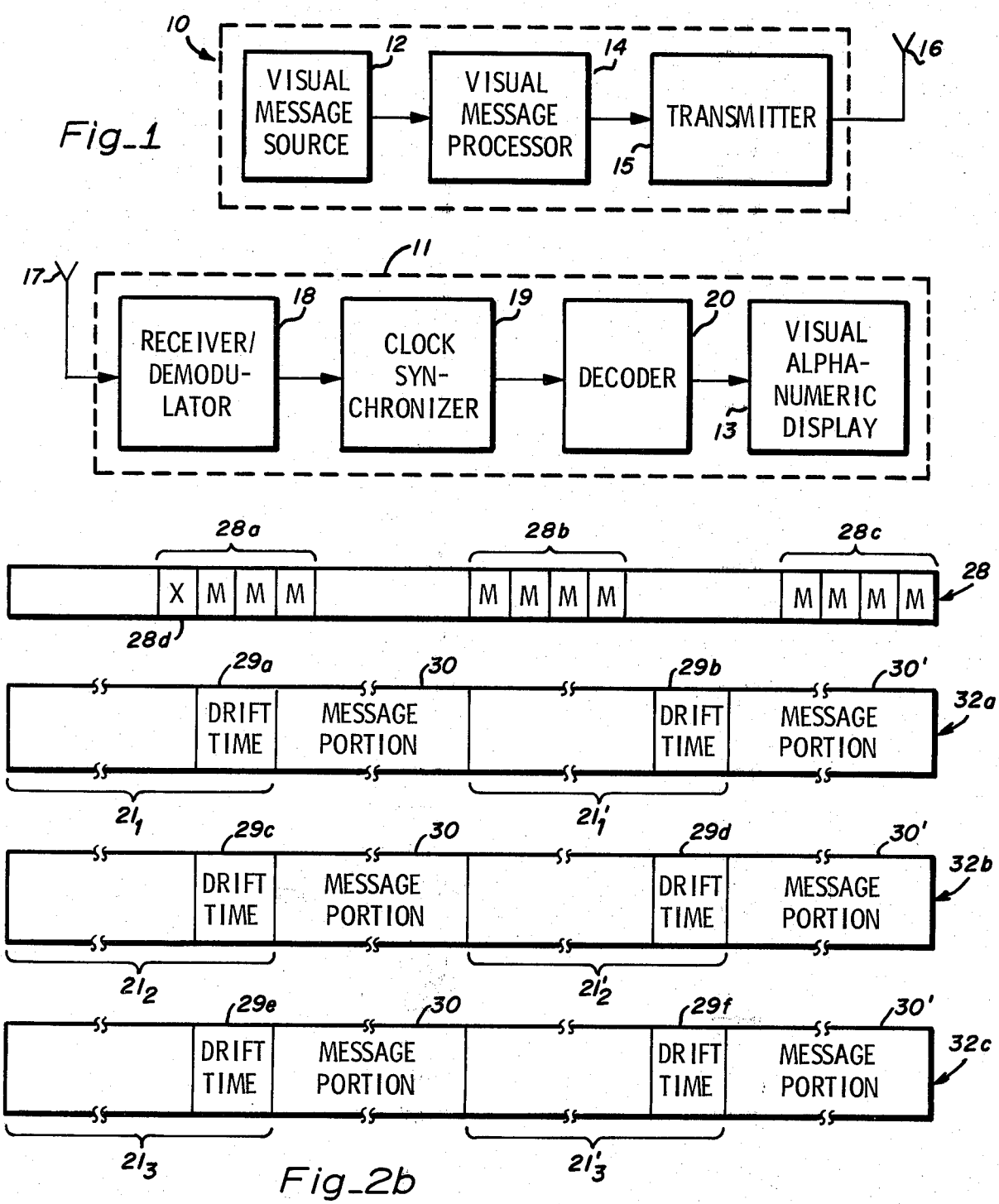
Fig_1
Fig_2b
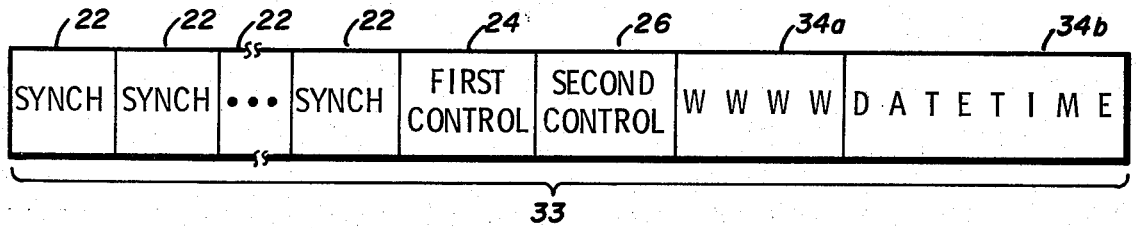
Fig_2c

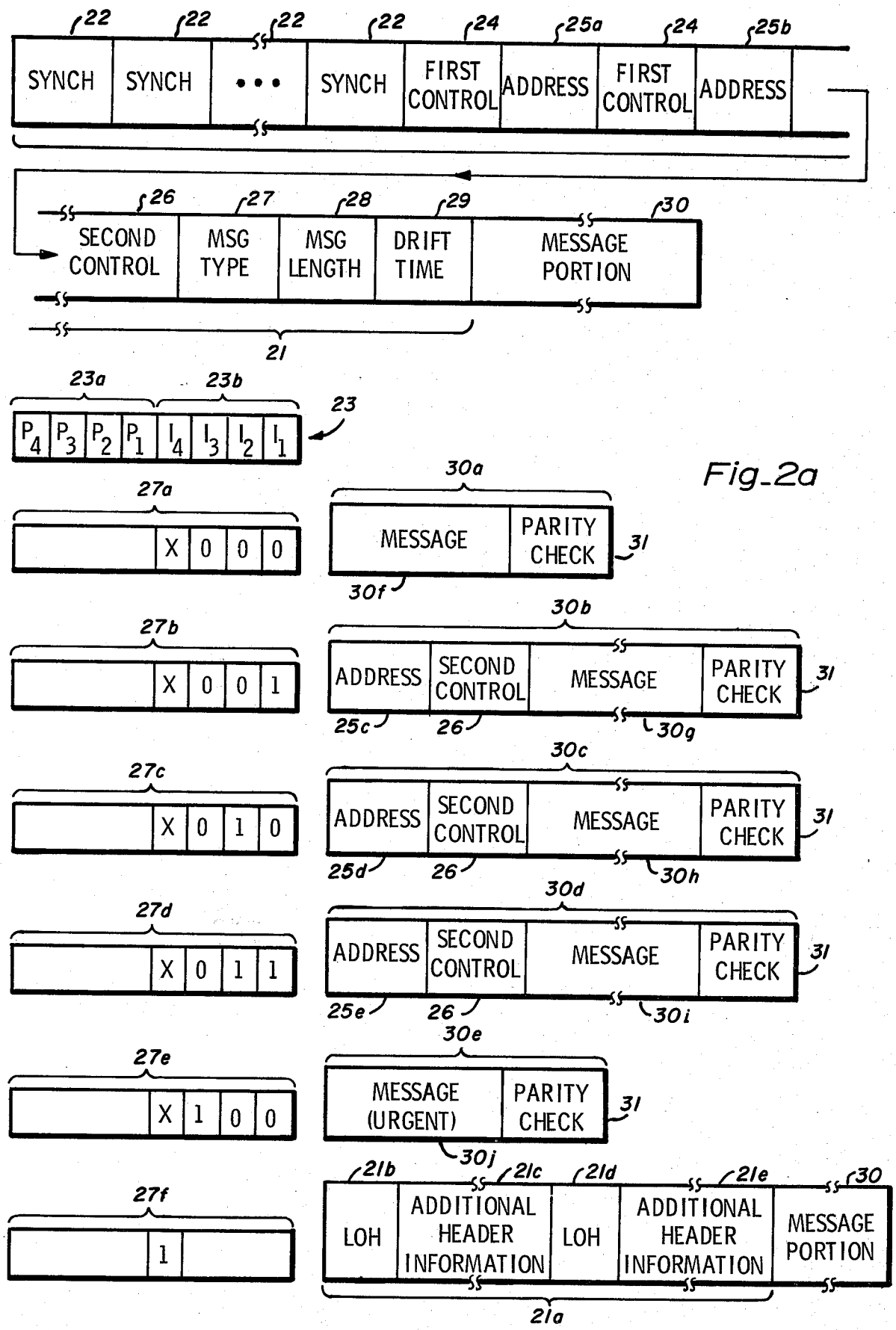

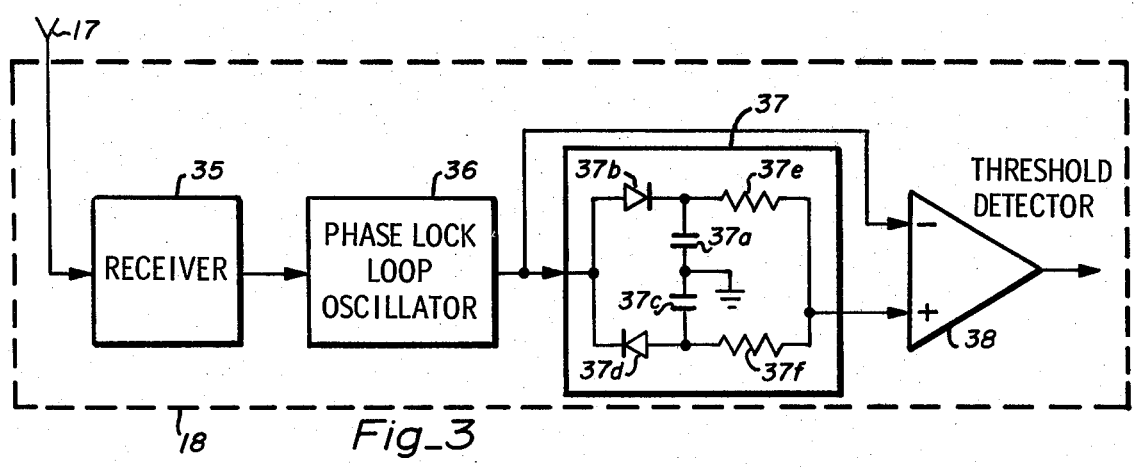
Fig_3
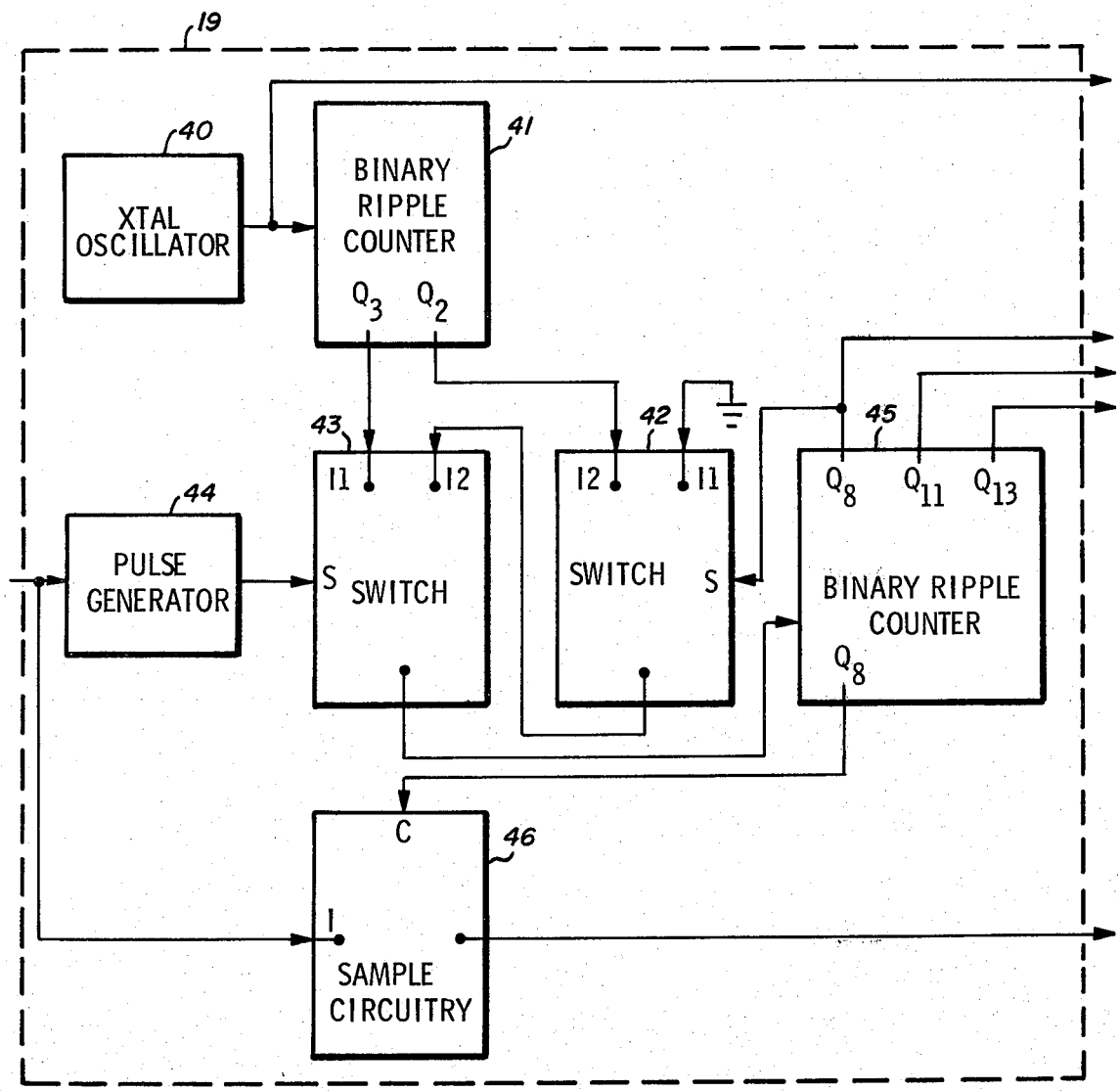
Fig_4

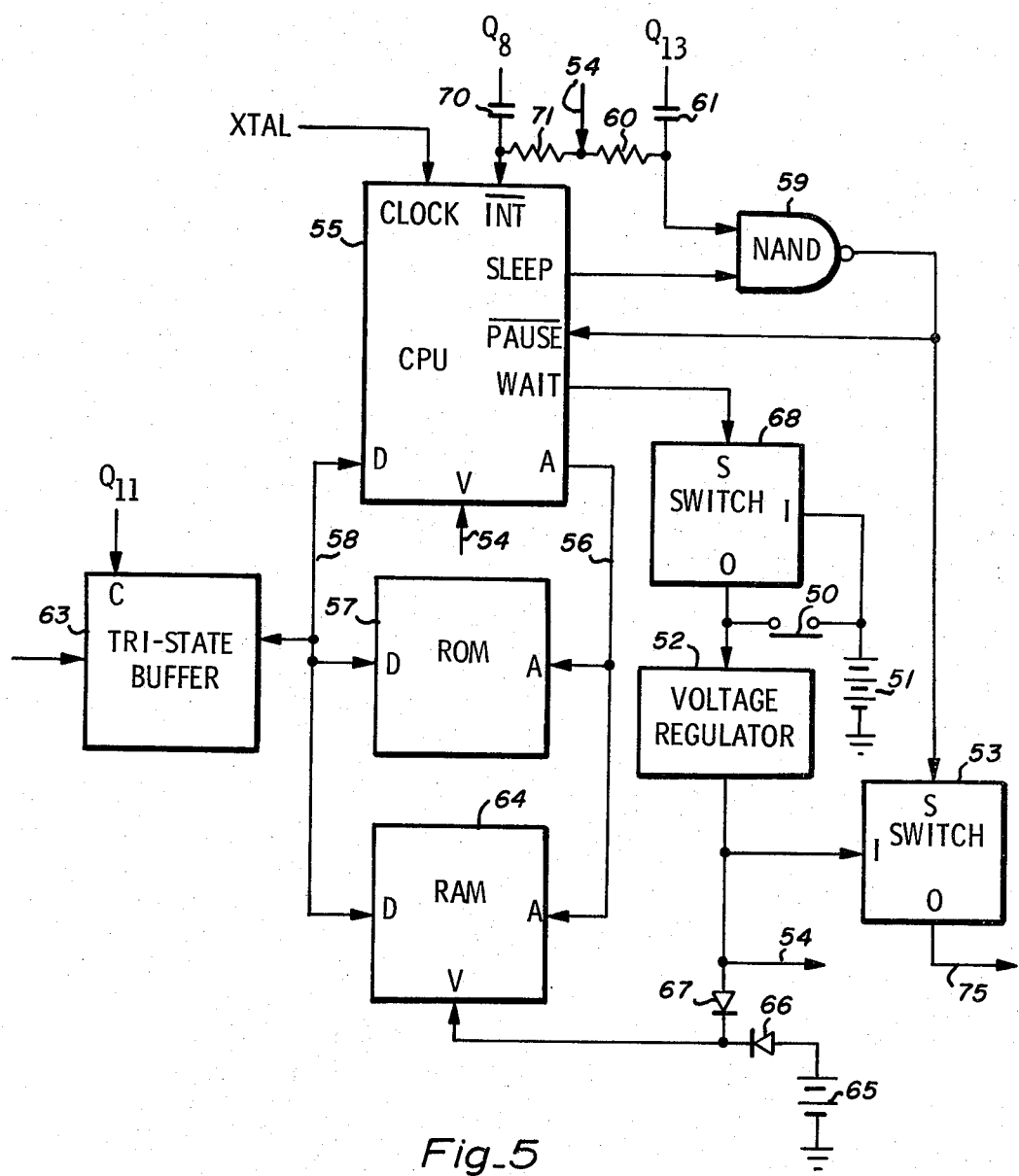
Fig_5

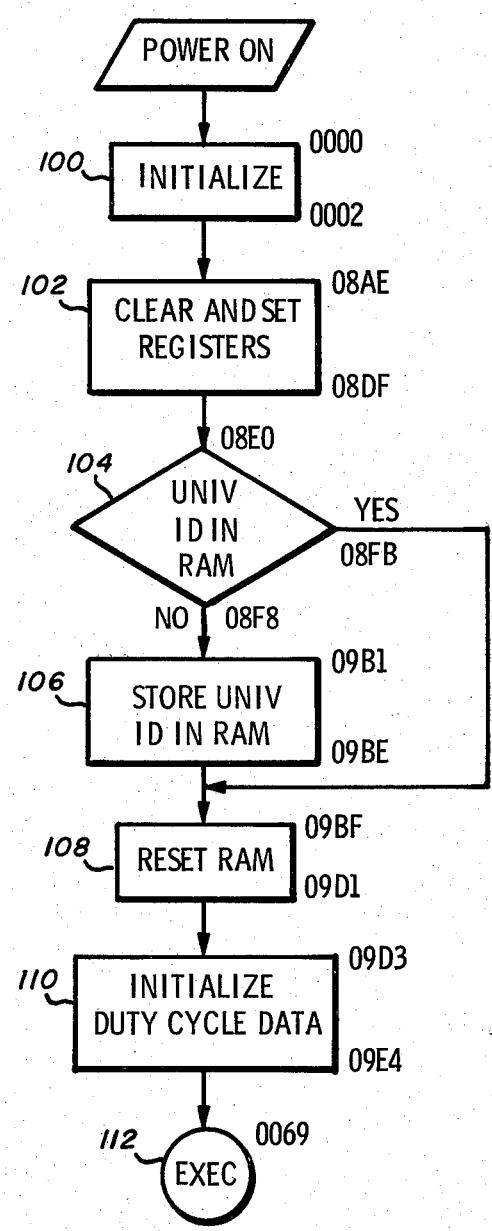
Fig_6

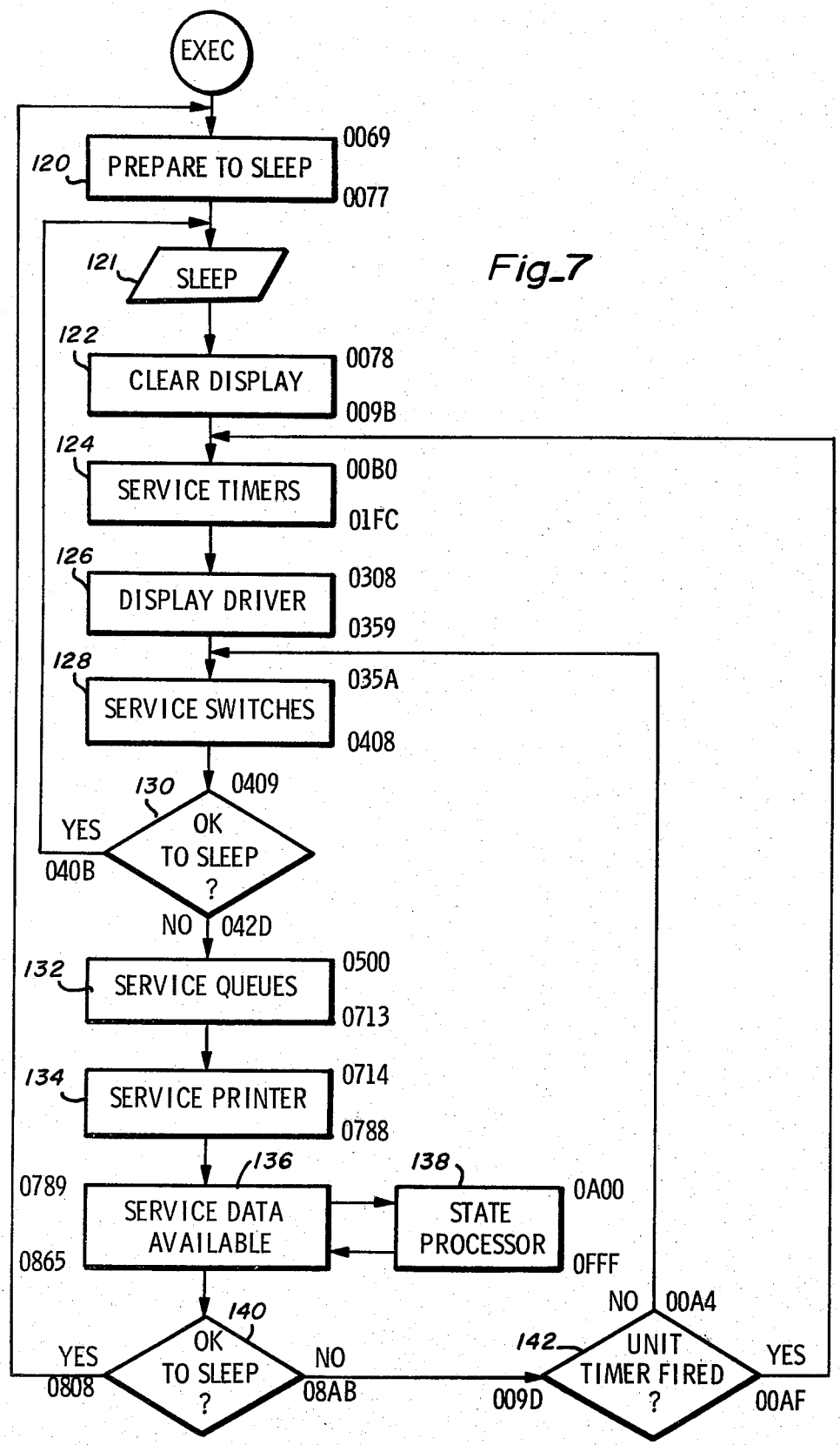
Fig_7

MESSAGE COMMUNICATION SYSTEM WITH MESSAGE STORAGE

This is a continuation-in-part of application Ser. No. 106,713 filed Dec. 26, 1979.

BACKGROUND OF THE INVENTION

The present invention relates generally to message communication and more particularly describes novel apparatus and techniques for reliably conveying messages to individuals or groups of individuals.

It is often desirable to reach individuals without disturbing them when a transmitted message is received, while also allowing such individuals to view the message at their convenience.

Heretofore, paging systems have generally been designed to reach a selected person who is made aware of the page by a beeper sound or the like upon which the paged person goes to the nearest telephone and calls the originator of the paging signal for the message. Another type of paging system has the ability to receive the message, providing the recipient with a paging signal followed by a voice message. A person carrying a paging system of either type may not wish to be disturbed, such as an attorney during court proceedings, and such person will turn off the paging device which loses the ability to inform the person that a message is intended for him. A person using the second type of paging system may be unable to understand the voice message in a noisy environment or unable to make notes of the voice message such as when operating a motor vehicle. If the person desires to review the voice message, he must telephone the originator of the message.

With another type of prior art system, the person is provided with a paging system that has the ability to receive the message and retain it as hard copy. Such a system is described in U.S. Pat. No. 3,846,783 which issued on Nov. 5, 1974. However, even that system lacked the ability to store messages in digitally encoded form so that the message may be reproduced whenever the recipient desires. Said system also lacked the ability to: provide each receiver with a plurality of addresses, remotely add or delete addresses from the personal receiver, and predetermine the character count of the transmitted message avoiding the possibility of a lost end of message character in transmission.

Accordingly, it is an important object of the present invention to provide a personal receiver that is light, compact and reliable enough to be carried by individuals.

It is a further object of the present invention to provide a first address uniquely identifying each receiver.

It is a further object of the present invention to provide a further address identifying a common group of receivers.

It is yet a further object of the present invention to have the capability to remotely add or delete or modify an address of the receiver.

It is still a further object of the present invention to store the message until the recipient is able to conveniently view the message on a visual display.

It is yet another further object of the present invention to allow the recipient to selectively view, retain, or delete messages stored in the personal receiver.

It is a further object of the present invention to warn the recipient when the receiver is out of range of the transmitting antenna.

It is a further object of the present invention to combine sequentially repeated transmission of the same message while storing the maximum number of error free characters of the single message.

SUMMARY OF THE PRESENT INVENTION

According to the invention, a binary encoded data train is developed and transmitted, where the data train has a message portion and a header preceding the message portion. The header signals include a plurality of synch signals, a first control signal marking the end of the synch signals, at least a first address signal, the first control signal also marking the beginning of each address signal in the event the header includes a plurality of address signals, a second control signal to mark the end of all address signals, and a message length signal which contains information of the total character count of the message portion.

A personal receiver includes synch means for preparing the personal receiver for reception of the data train and an address means responsive to the address signal. The address means includes a first addressable means responsive to an address signal uniquely identifying the personal receiver and a second addressable means programmable by the message portion. In an addressed personal receiver, a message means receives and stores the message portion and selectively displays the message portion in alphanumeric characters.

Numerous other features, object and advantages of the present invention will become apparent from the following specification when read in connection with the accompanying drawings.

BRIEF DESCRIPTION OF THE DRAWINGS

FIG. 1 shows a block diagram illustrating the transmitting system and the personal receiver;

FIG. 2a shows a formatting diagram of the header and message portions developed by the transmitting system of FIG. 1;

FIG. 2b shows a stacked and repeated data train format;

FIG. 2c shows a format of a further sequentially transmitted data train utilized by the personal receiver;

FIG. 3 is a more detailed schematic block diagram illustrating the receiver/demodulator of FIG. 1;

FIG. 4 is a more detailed schematic block diagram illustrating the bit synchronizer of FIG. 1;

FIG. 5 is a more detailed schematic block diagram illustrating the decoder of FIG. 1;

FIG. 6 is a flow diagram of the program and operation of the decoder in the receiver shown of FIG. 5 illustrating the initialization routine;

FIG. 7 is a flow diagram of the program and operation of the decoder in the receiver shown in FIG. 5 illustrating the executive routine;

DETAILED DESCRIPTION OF THE DRAWINGS

Figure 8:
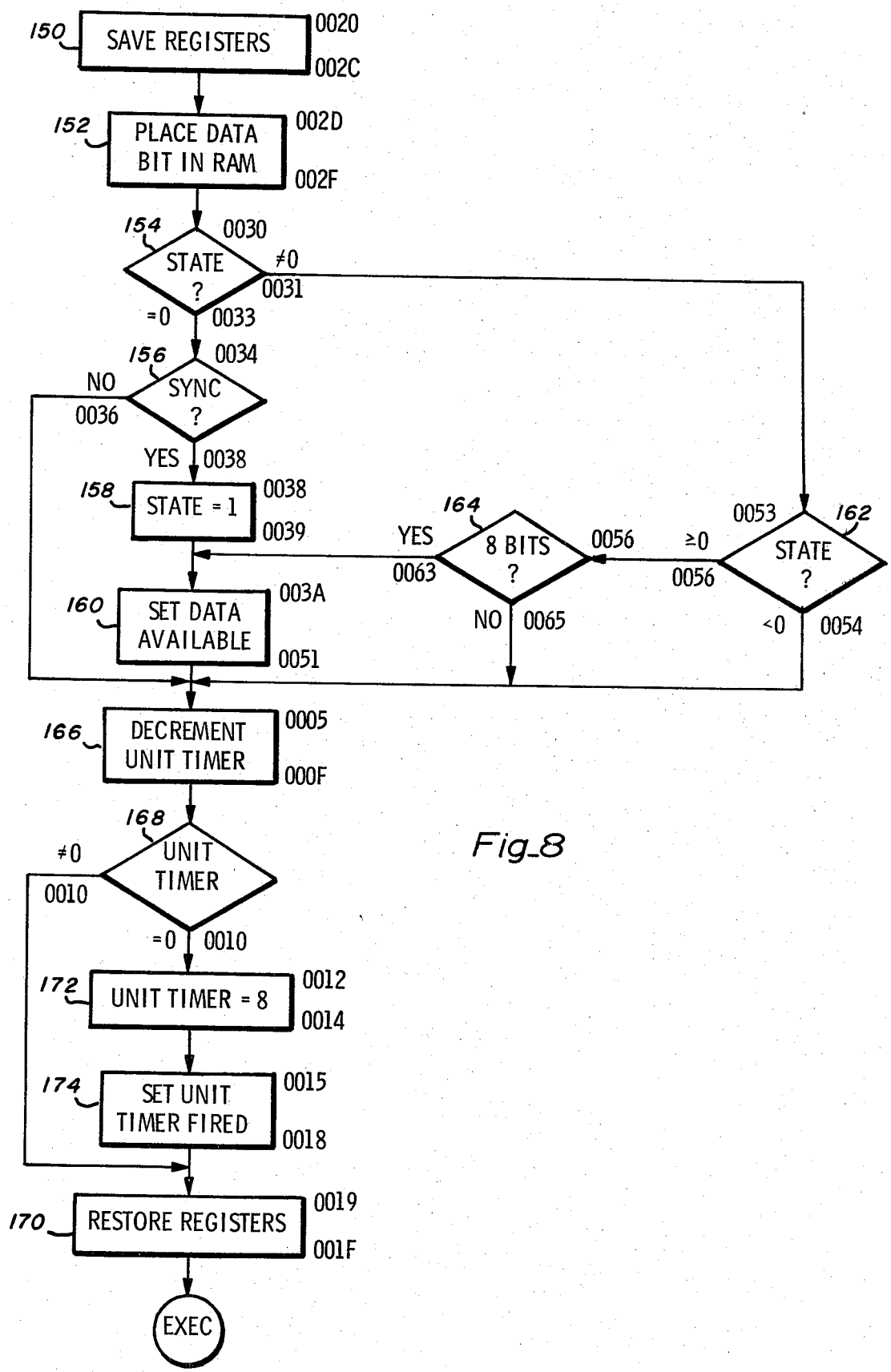
FIG. 8 is a flow diagram of the program and operation of the decoder of the receiver shown in FIG. 5 illustrating the interrupt service routine.

FIG. 1 shows a schematic block diagram illustrating the overall message communication system comprising transmitting means 10 and a personal receiver 11. The system illustrates the manner in which a message entered at a visual message source 12 is viewed on a visual alphanumeric display 13 built into personal receiver 11 carried by the intended recipient or plurality of recipients. Visual message source 12 encodes the message into a series of binary logic levels or data bits and applies the message in the digitally encoded form to a visual message processor 14, which then converts the digital data into a corresponding sequence of audio frequencies for modulating transmitter 15, preferably by frequency modulation, to radiate a binary encoded data train from an antenna 16.

A receiving antenna 17 receives the transmitted energy and applies it to a receiver/demodulator 18 which includes the usual circuits for detecting the binary encloded data train and demodulating the carrier modulated by the audio frequencies into the corresponding sequence of binary logic levels. The demodulated digital data is then applied to a bit synchronizer 19 which synchronizes the internal clocks of personal receiver 11 to the incoming data train so that each of the binary data bits can be properly sampled and applied to a decoder 20 which stores the message prior to display of said message on visual alphanumeric display 13.

Visual message source 12 may be a standard keyboard terminal such as the Lear Siegler Inc., Model ADM-3A Dumb Terminal which converts alphanumeric characters to binary encoded electrical signals such as the ASCII code which is well known in the art. Each character of the ASCII code contains one start bit, seven information bits, one parity bit, and two stop bits. Decoder 20 is selected to decode ASCII characters. Visual message source 12 of course need not be the above described terminal but may be any means of converting alphanumeric characters into a selected code with a suitable decoder 20 being selected to decode the same.

Visual message processor 14 accepts the digital data from visual message source 12 and in the usual manner will convert the digitally encoded information into a series of analog audio frequencies. To facilitate the operation of receiver/demodulator 18 and bit synchronizer 19, the audio frequency which corresponds to the low binary logic level is set at 1.5 times the frequency of the audio frequency which corresponds to the high binary logic level, and that the data train bit rate generated by visual message processor 14 is identical to the audio frequency encoding the high binary logic level. In a preferred embodiment of the present invention, the low binary logic level is chosen to have a corresponding audio frequency of 1800 Hz and the high binary logic level to have a corresponding audio frequency of 1200 Hz. The data train containing these audio frequencies is applied to transmitter 15 at a rate of 1200 bits/second. Of course any audio frequencies can be chosen, however, receiver/demodulator 18 and bit synchronizer 19 will operate at a slower bit rate or become electronically more complex.

The data train, now consisting of a series of audio frequencies, is modulated onto a carrier frequency utilizing the well known method of frequency modulation. The frequency modulated RF signal is applied to antenna 16 for transmission to personal receiver 11.

The hereinabove described message communication system shows a message being developed and transmitted by transmitting means 10 and received by personal receiver 11. The message communication system can be expanded to communicate messages to a selected personal receiver or selected group of personal receivers. As hereinafter described, each receiver 11 includes an address means within decoder 20. A digitally encoded address signal precedes the message, the address signal may identify a selected personal receiver or a selected group of personal receivers. Visual message processor 14 may be a commercially available data processing and time sharing computer network, such as Tymshare, Inc. The address signal as well as other hereinafter described signals, which comprise a header preceding the message, are developed by visual message processor 14. The header format as hereinafter described will enable a person skilled in the art to program the commercially available computer network to develop the header preceding the message.

FIG. 2a shows a message portion 30 and a header 21 including a plurality of synch signals 22 for preparing personal receiver 11 (FIG. 1) for reception of the data train, a first control signal 24 marking the end of the plurality of synch signals 22, an address signal 25a for addressing the personal receiver for which the message is intended defining an addressed personal receiver, and a further address signal 25b which may optionally be included in header 21, a second control signal 26 to mark the end of all address signals, a message type signal 27 containing selected instructions for the addressed personal receiver relative to the utilization of the message portion 30, a message length signal 28 containing information of the total character count of message portion 30, and a drift time signal 29 containing information of the time remaining until the end of the data train.

Each synch signal 22 includes a plurality of data bits selected for maximizing the number of transitions between data bits while also conveying framing information to decoder 20 of FIG. 1. In a preferred embodiment of the present invention, each synch signal 22 contains a hexadecimal D4 or binary 11010100. The number of synch signals 22 should be at least 60 to insure detection as hereinafter described in reference to reception duty cycle means.

The remaining signals in header 21, which will hereinafter be fully described, are all encoded by a well known redundant binary code for detecting and correcting single bit errors occuring during data transmission. The redundant code chosen must be capable of being detected by decoder 20 of FIG. 1. In a preferred embodiment of the present invention, all of the signals in header 21 are encoded by the well known 8421 weighted Hamming code modified as hereinafter described. A typical byte 23 of header 21 includes an error correcting nibble 23a and an information nibble 23b. Each subscripted I represents an information or data bit of information nibble 23b. Each subscripted P of error correcting nibble 23a represents the redundant bits of the 8421 Hamming code. The method by which the Hamming code detects and corrects errors is well known in the art and need not be further described.

Following the plurality of synch signals 22 is first control signal 24 including a plurality of data bits selected so that the data bit pattern does not match the data bit pattern of synch signal 22. In a preferred embodiment of the present invention, first control signal 24 includes eight binary data bits containing a hexadecimal FF or binary 11111111.

Following first control signal 24 is at least one address signal 25a for identifying a unique personal receiver or a selected group of personal receivers. Address signal 25a includes a plurality of data bits whose data bit pattern may not match the bit pattern of first control signal 24 or second control signal 26. In a preferred embodiment of the present invention, address signal 25a includes eight bytes formatted in the hereinabove modified hamming code from which eight information nibbles can be obtained. Header 21 may also contain a plurality of further address signals, such as address signal 25b, for identifying corresponding personal receivers for reception of the same data train. First control signal 24 also marks the beginning of each address signal following address signal 25a. Second address signal 25b is of different data bit configuration from address signal 25a. Should it be desired to include further address signals (not shown), each further included address signal is preceded by first control signal 24.

Following all address signals is second control signal 26 to mark the end of all address signals. Second control signal 26 includes a plurality of data bits whose data bit pattern may not match the data bit pattern of first control signal 24 or any hereinabove described address signal. In a preferred embodiment of the present invention, second control signal 26 includes two bytes formatted in the hereinabove described modified Hamming code where each such byte is identical to first control signal 24. It is not necessary that second control signal 26 include two bytes where each byte is identical to first control signal 24, since any data bit pattern may be utilized for second control signal 26 as long as it is capable of being decoded as a second control signal marking the end of all address signals.

Following second control signal 26 is message type signal 27 containing selected instructions for the addressed personal receiver relative to the utilization of message portion 30. In a preferred embodiment of the present invention, message type signal 27 includes one byte formatted in the hereinabove described modified Hamming code wherein the three least significant bits contain the selected instructions.

The first instruction shown as 000 in message type signal 27a represents that the following message portion 30a includes a message 30f for the addressed personal receiver to be stored in a hereinafter described message means. Message 30f and all hereinafter described messages are developed by the hereinabove described visual message source 12 of FIG. 1.

The second instruction shown as 001 in message type signal 27b represents that the following message portion 30b includes an address signal 25c to which a hereinafter described second addressable means will be made non-responsive. As hereinafter described, each personal receiver 11 includes an address means responsive to the hereinabove described address signals having a first addressable means responsive to an address signal uniquely identifying the personal receiver and a second addressable means programmable by message portion 30. Message 30g is stored in the message means and contains the alphanumeric representation of address signal 25c and when displayed will advise the recipient that the second addressable means has been made non-responsive to address signal 25c. When header 21 includes message type signal 27b, address signal 25a is the only address signal allowed in header 21 and must uniquely identify the personal receiver or be the same as address signal 25c.

The third instruction shown as 010 in message type signal 27c represents that the following message portion 30c includes an address signal 25d to which the second addressable means will be made responsive. Message 30h is stored in the message means and contains the alphanumeric representation of address signal 25d and when displayed will advise the recipient that the second addressable means has been made responsive to address signal 25d. When header 21 includes message type signal 27c, address signal 25a is the only address signal allowed in header 21 and must uniquely identify the personal receiver.

The fourth instruction shown as 011 in message type signal 27d represents that the following message portion 30d includes an address signal 25e and a message 30i which is stored in the message means and when displayed will advise the recipient that the second addressable means has been made non-responsive to all address signals. When header 21 includes message type signal 27d, address signal 25a is the only address signal allowed in header 21 must uniquely identify the personal receiver and be repeated as address signal 25c.

The fifth instruction shown as 100 in message type signal 27e represents that the following message portion 30e contains urgent message 30j to be stored in the message means overriding the storage of other hereinabove described messages, should storage locations be insufficient for all messages stored in the message means.

In each of the hereinabove described message type signals 27a through 27e, the most significant bit of the information nibble was shown as X, representing that this bit may contain 0 or 1. Normally this bit will contain 0, however, should it contain 1 as shown in message type signal 27f, a corresponding additional header 21a is inserted between drift time signal 29 and message portion 30. Additional header 21a includes at least one length of remaining header signal (LOH) 21b and additional header information signals 21c which contain selected information for the addressed personal receiver. In one embodiment of the present invention, additional header information signals 21c include 256 bytes formatted in the hereinabove described Hamming code, and LOH signal 21b includes 2 bytes thereof, and contains information of the total character count of additional header information signals 21c, by representing the decimal character count in binary representation in the eight bits provided by the two information nibbles. However, should each nibble contain a hexadecimal 0, the additional header signals 21c contain 256 bytes and a further LOH signal 21d follows containing information of the character count of further additional header signals 21e.

Following message type signal 27 is message length signal 28 which contains information of the total character count of message portion 30 and also the character count of additional header 21a if present. Message length signal 28 includes a plurality of data bits representing the amount of storage to be utilized in the message means for message portion 30. In one embodiment of the present invention, message length signal 28 includes 3 bytes formatted in the hereinabove described Hamming code from which 3 information nibbles can be obtained. Of these three nibbles, all but the most significant bit in the first nibble are used to count the character, allowing a character count not exceeding $2^{11}$. The most significant bit in the first nibble contains information of an immediately following data train, as hereinafter described.

Following message length signal 28 is drift time signal 29 which contains information of the time remaining until the end of message portion 30 or in the event of repeated transmissions of the data train, the time remaining until the end of all repeated data trains. Drift time signal 29 includes a plurality of data bits which encode the time remaining. Each personal receiver 11 includes a hereinafter described reception duty cycle means which sequentially activates the receiver for a first time period and deactivates the receiver for a second time period, and a hereinafter described control means responsive to drift time signal 29 for changing either time period commensurate with the time encoded by drift time signal 29. In a preferred embodiment of the present invention, drift time signal 29 includes three bytes formatted in the hereinabove described Hamming code from which 3 information nibbles can be obtained. The information nibbles of drift time signal 29 may contain a hexadecimal 0 to a hexadecimal FFF, encoding, in one embodiment of the present invention, real time values of $26\frac{2}{3}$ ms to 109 s.

Included in message portion 30 is a parity check signal 31 which includes a plurality of data bits which represent an overall parity check of the aforementioned messages, and is developed by visual message processor 14 of FIG. 1. As hereinafter described, the addressed personal receiver performs the identical parity check on the received message developing an internal parity check signal. Parity check signal 31 is compared to the internally developed signal, and if the same, the message has been received without error, and if different, a possible error exists in the message. The control means, further responsive to parity check signal 31 and operative to extend the second time period commensurate with drift time signal 29 if no error is detected, or to extend the first time period commensurate with drift time signal 29 if an error occurred allowing monitoring of repeated transmissions of the data train, is provided. In one embodiment of the present invention, parity check signal 31 includes eight data bits of information. The most significant bit is in an even parity check bit of the remaining seven bits. The seven least significant bits may contain a hexadecimal 0 to a hexidecimal 7F.

FIG. 2b shows a general format for stacking and repeating data trains. A hereinabove described, message length signal 28 contains information of the presence of an immediately following data train. Message length nibbles 28a, 28b, and 28c represent the three information nibbles in the hereinabove described embodiment of message length signal 28. The most significant bit 28d of message length nibble 28a may contain either a 0 or 1. If a 0 is contained therein, the presence of an immediately following data train is verified. The control means is further responsive to message length signal 28, and more particularly, bit 28d, to extend the first time period to assure reception of the immediately following data train.

Data train 32a represents an example of stacking a first data train including a fist header 21₁ and message portion 30 with a second immediately following data train including a second header 21₁' and a second message portion 30'. Data trains 32b and 32c represent sequentially repeated representations of data train 32a. The hereinabove description of header 21 of FIG. 2a applies equally to all of the headers shown in FIG. 2b. The only differences are in drift time signal 29 of FIG. 2a. Header 21₁ includes drift time signal 29a which contains information of the time remaining until the end of data train 32c. Header 21₁ is repeated as header 21₂ and 21₃ in data trains 32b and 32c, respectively, the only modification occurring in drift time signals 29c and 29e which both contain information of the time remaining until the end of data train 32c measured in real time from their occurrence in their respective headers. Similarly, drift time signals 29b, 29d, and 29f contain information of the time remaining until the end of data train 32c measured in real time from their occurance in headers 21'₁, 21'₂, and 21'₃, respectively.

FIG. 2c shows the format of a further sequentially transmitted data train 33 utilized by personal receiver 11 to determine if such receiver is out of range of transmitting means 10 of FIG. 1. Data train 33 includes the hereinabove described plurality of synch signals 22 immediately followed by first control signal 24 which is in turn immediately followed by second control signal 26. Further included in data train 33 is a timing signal 34a which contains information of a third time period and a clocking signal 34b containing information of the date and time of the transmission of data train 33. Each receiver 11 further includes an out of range warning means for developing an alphanumeric message on display 13 of FIG. 1 to advise the user of personal receiver 11 when such receiver is out of range of transmission means 10 of FIG. 1. The hereinafter described out of range warning means is responsive to timing signal 34a and operative to develop the warning message when a transmission of data train 33 has not been received within the time period specified within timing signal 34a.

The message means is responsive to clocking signal 34b and operative to display an alphanumeric representation of the date and time information contained in the most recently received clocking signal 34b preceding those messages received subsequent to the reception of each clocking signal 34b. It should be noted that data train 33 is sequentially transmitted at regular time intervals, and the hereinabove mentioned data trains containing messages are interspersed therein.

FIG. 3 shows a more detailed schematic block diagram of receiver/demodulator 18 of FIG. 1. Receiver 35 demodulates the incoming binary encoded data train by conventional means and applies the hereinabove described sequence of audio frequencies to the input of a phase locked loop oscillator 36. As phase locked loop oscillator 36 tracks the frequency and phase of the incoming audio frequencies, an output is generated which is a series of electrical signals approximating the corresponding binary logic levels. By choosing the hereinabove described relationship between the audio frequencies used to encode the two binary logic levels and the transmission rate of the data train, operation of phase locked loop oscillator 36 is facilitated by the phase relationship that exists between successive bits of information as encoded by the audio frequences. The voltage controlling the voltage controlled oscillator of phase locked loop oscillator 36 is utilized as the output. In one embodiment of the present invention, phase locked loop oscillator 36 may be any commercially available phase locked loop oscillator integrated circuit such as the 4046 commercially available from National Semiconductor.

The output of phase locked loop oscillator 36 is applied to a signal level averager 37 for detecting the most negative and the most positive peak voltage of the applied electrical signal. Averager 37 includes a capacitor 37a for storing the highest positive peak voltage occurring when a diode 37b becomes forward biased. A capacitor 37c stores the most negative peak voltage occurring when a diode 37d becomes forward baised. Two equivalent resistors 37e and 37f average the voltages stored by capacitors 37a and 37c, respectively. The node between the two resistors 37e and 37f is at a voltage level which is the average of the stored voltage levels. In one embodiment of the present invention, capacitors 37a and 37c are 0.1 uf. Diode 37b and 37d are both commercially available 1N 4148 diodes, and resistors 37e and 37f are 470 kohm.

A threshold detector 38 compares the applied signal from phase locked loop oscillator 36 to the applied signal from averager 37. Whenever the electrical signal applied from phase locked loop oscillator 36 is at a higher voltage than the electrical signal applied from averager 37, threshold detector 38 generates an electrical signal that corresponds to the low binary logic level. Conversely, the high binary logic level is generated when the electrical signal applied from phase locked loop oscillator 36 is at a lower voltage than the signal applied from averager 37. Thershold detector 38 may be a commercially available differential amplifier, operated with a positive supply voltage equal to the voltage encoding the high binary logic level, and with the negative supply voltage coupled to ground. A series resistance-capacitance feedback path (not shown) is connected between the output and the non-inverting input of the differential amplifier, and the electrical signal generated by phase locked loop oscillator 36 is applied to this inverting input. The output of averager 37 is applied to the non-inverting input of the differential amplifier. The output of the differential amplifier develops a series of DC voltage levels which correspond to the binary logic levels of the data train developed by visual message processor 14 (FIG. 1). In one embodiment of the present invention, threshold detector 38 is a commercially available RCE CA 3130A amplifier.

FIG. 4 shows a more detailed schematic block diagram of bit synchronizer 19 of FIG. 1. A crystal oscillator 40, which is of conventional design, generates a clock pulse train that is applied to a first binary ripple counter 41. The Q2 output of counter 41 is a lower frequency pulse train which is applied to the I2 input of a first switch 42. The Q3 output of counter 41 applies a still lower frequency pulse train to the I1 input of a second switch 43. The I1 input of first switch 42 is coupled to ground and the output of first switch 42 is applied to the I2 input of second switch 43. First switch 42 and second switch 43, both of which are of conventional design, operate so that when their respective switching input S is at a low binary logic level, the I1 input is enabled to the output. If their respective switching input S goes to a high binary logic level, then the I2 input is enabled to the output.

The output from threshold detector 38 (FIG. 3) is applied to the input of a pulse generator 44 for generating a pulse of a high binary logic level for a time period significantly briefer than the time period of a single data bit of information whenever there is a transition in the binary logic level between successive data bits applied to its input. Pulse generator 44 includes a common exclusive-or (EX-OR) gate with two logical inputs. The output of threshold detector 38 is applied directly to one of the inputs of the EX-OR gate, and also applied to the other input of the EX-OR gate through a time delay network. The output pulse generated when there is a change of binary logic levels between successive data bits is of a time duration equal to the amount of time delay provided at the input of the EX-OR gate. The time delay function may be realized by applying the output of threshold detector 38 through a resistor which is then applied to a common node of the second logical input of the EX-OR gate and a grounded capacitor. In one embodiment of the present invention, the time delay should be approximately 2–3% of the time period of a single data bit of information. The output of pulse generator 44 is applied to the S input of second switch 43.

In the above described mode of operation, second switch 43 will normally have its I1 input enabled to its output which is applid to counter 45. Counter 45 divides the frequency of the incoming clock pulse train, which in the normal mode of operation, is the Q3 output of counter 41 as enabled through the output of switch 43. The divided frequency clock pulse train generated by the Q8 output of the counter 45 is applied into the S input of switch 42. The Q2 output of counter 41 is enabled to the output of switch 42 for one half of the time period of the clock pulse train developed by the Q8 output of counter 45. The output of switch 42 is the clock pulse train developed by the Q2 output of counter 41 gated by the clock pulse train generated by the Q8 output of counter 45 having been applied to the S input of switch 42.

Where the time period of the clock pulse train generated by the Q8 output of counter 45 is identical to the time period of a data bit of information, the Q8 output of the second binary ripple counter 45 will become synchronous with the data train applied to pulse generator 44. When pulse generator 44 applies a high binary logic level to the S input of switch 43, the output from switch 42 is enabled to the input counter 45. In this mode of operation the next transition state of the Q8 output of counter 45 is delayed for a period of time that is equal to the time that the I1 input of the first switch 42 is enabled to the input of counter 45; or the next transition state of the Q8 output of counter 45 will be time shifted forward for a period of time that is equal to the time that the I2 input of the first switch 42 is enabled to the input of the second binary ripple counter 45. By also applying the Q8 output of counter 45 to the S input of switch 42, a feedback loop is established so that synchronization will occur when the I1 and I2 inputs of switch 42 are sequentially enabled to the input of counter 45 for an equal period of time whenever a pulse is applied to the S input of switch 43. When synchronism occurs, the leading edge of the pulse train generated by the Q8 output of counter 45 will occur in real time at the center of a data bit.

Synch signal 22 (FIG. 2) is chosen to maximize the number of transition states between successive data bits to enable the clock synchronizer to minimize, synchronization time of the Q8 output of the second binary ripple counter 45 with the data train.

The data bits are sampled by applying the output of the threshold detector 38 to a sample circuitry 46. Sample circuitry 46 provides means by which the applied input at input I is enabled to and stored at the output when a positive leading edge of the clock pulse train is applied to clock input C from the Q8 output of the second binary ripple counter 45. The sampling and storage means are conventional and are realized in one embodiment of the present invention by a switch and a storage capacitor.

Oscillator 40 also applies its clock pulse train to decoder 20 (FIG. 1); and the Q8, Q11, and Q13 outputs of counter 45 are also coupled to decoder 20. These clock pulse trains provide the timing for decoder 20 to execute the hereinafter described programs therein.

In one embodiment of the present invention, oscillator 40 provides a clock pulse train of 2.4540 MHz. The Q2 output and the Q3 output of counter 41 develop clock pulse trains of 613.5 kHz and 306.7 kHz, respectively. The Q8, Q11, and Q13 outputs of counter 45 develop pulse trains of 1200 Hz, 150 Hz, and 37.5 Hz, respectively.

FIG. 5 shows a more detailed schematic block diagram of decoder 20 of FIG. 1. An external on-off switch 50 enables electrical energy from an energy source 51 to be applied to a voltage regulator 52. Voltage regulator 52, which is of conventional design, applies a constant electrical voltage level to a switch 53 and an electrical energy supply line 54. Switch 53 enables the electrical energy applied at input I to the output 0 whenever its switching input S is at a high binary logic level. Switch 53 applies the electrical energy at output 0 to an electrical energy supply line 75, which supplies electrical energy to receiver/demodulator 18 and display 13 of FIG. 1. Electrical energy supply line 54 is coupled to a central processing unit (CPU) 55 at its V input and to resistors 60 and 71.

At the conclusion of the hereinafter described initialization program, the CPU 55 will generate a sleep signal and apply such signal to a NAND gate 59 where such signal is a high binary logic level. The second input of NAND gate 59 has applied to it an electrical signal which is normally at a high binary logic level. When both inputs to NAND gate 59 are a high binary logic level, NAND gate 59 develops an electrical signal that is at a low binary logic level. This electrical signal when at the low logic level and applied to the PAUSE input of CPU 55 will cause the CPU 55 to cease operation in the execution of the instruction sets of the program. Also the NAND gate 59 will apply the low binary logic level signal to the S input of the switch 53 thereby disabling the input I to the output 0. The electrical energy is removed from line 75. When the clock pulse train generated by the Q13 output of counter 45 (FIG. 4) is applied to capacitor 61 and goes to a low binary logic level, the hereinafter described reception duty cycle activates the monitoring mode. Capacitor 61 develops a negative pulse responsive to the trailing edge of the clock pulse train, and applies said pulse to the second input of NAND gate 59, which develops a positive pulse for application to the S input of switch 53, enabling electrical energy to the output 0 and the electrical energy supply line 75. The positive pulse is also applied to the PAUSE input of CPU 55 which then resumes execution of the instruction sets until another SLEEP signal is generated. Capacitor 61 is recharged from current through resistor 60. The cyclical operation is hereinafter referred to as the reception duty cycle means.

During the active monitoring mode, the data train from sample circuitry 46 (FIG. 4) is applied to a tristate buffer 63. The tristate buffer 63 accepts the data train and applies the data train to a data bus 58 which transfers the data train under program control to CPU 55, which analyzes the data prior to the data being accepted in RAM 64.

The Q8 output generated by counter 45 is applid to an isolation capacitor 70 which develops a negative pulse upon the occurrence of a trailing edge of the clock pulse train applied to it. This negative pulse is applied to the INT input of CPU 55 which causes an interrupt subroutine as hereinafter described to be executed. This subroutine will enable the data train to be accepted onto data bus 58 and applied to CPU 55. Capacitor 70 is recharged from a current through a resistor 71.

Whenever CPU 55 generates a memory address over an address bus 56 to be applied to RAM 64, a simultaneous signal will be generated of a high binary logical level from the WAIT output and applied to the S input of switch 68, the WAIT signal will override the external on-off switch 50, enabling a constant source of energy to be applied to the electrical energy supply line 54. The WAIT signal is necessary to allow completion of the operations of the instruction whenever the RAM 64 is being addressed to protect its memory contents.

In one embodiment of the present invention, CPU 55 is a commercially available RCA 1802 microprocessor and the employment and programming of said processor is well documented in the art. ROM 57 is preferrably any commercially available CMOS read only memory integrated circuit with the capability of storing at least four-thousand ninety-six eight bit words. RAM 64 is preferrably any commercially available CMOS random access memory integrated circuit with the capability of storing at least one-thousand twenty-four eight bit words. Energy source 51 is preferrably a NiCd battery of approximately 6.2 v and energy source 65 is preferrably an Li battery of at least 2 v. The NiCd battery is preferred for its nearly constant voltage output prior to becoming discharged whereas the Li battery is preferred because of its long shelf life since this battery is only used to supply microwatts of power to RAM 64 when the NiCd is fully discharged or disabled from voltage regulator 54. Voltage regulator 52 preferrably provides a well regulated output voltage of five volts regulated within ±0.25 volts while supplying up to 10 ma of current. Should power from the voltage regulator drop below the voltage of energy source 65, diode 66 becomes forward biased and diode 67 becomes reverse biased whereby the RAM 64 is effectively nonvolatile.

Visual alphanumeric display 13 may be any electronic digital display which has the capability of converting binary encoded characters into readable alphanumberic characters. In the preferred embodiment of the present invention, display 13 provides a readout of twenty characters by utilizing five Litronix DL1414 display modules of four characters apiece. A character is enabled to the display by first addressing that character stored in RAM 64, applying said character to data bus 58, and applying the character to the display module to be displayed at the location on said module determined by a memory address applied from address bus 56. In this mode of operation the display appears to the CPU 55 as additional memory locations. Alert functions, such as a beeper, may also be incorporated into the circuitry as virtual memory locations. These techniques as well known in the art and need not be further discussed.

It is within the scope of the invention to provide a hard copy record of the messages. A message may be retrieved from RAM 64 in the usual manner. A character printer may be connected to the appropriate output port (not shown) of the CPU 55.

The structure of the personal receiver 11 of FIG. 1 has been described as well as a great deal of its operation. But the sequence of events that have been discussed above have been controlled by the programs recorded permanently in ROM 57 of FIG. 5. These programs are given in exhibit "A" hereto for a particular embodiment of the system being described, and a flow chart of the operations of the central processing unit 55 programmed by the programs of Exhibit "A" is given in FIGS. 6, 7, and 8. By referring to the program of Exhibit "A" and the flow charts of FIGS. 6, 7, and 8, the programmed operation of CPU 55 can be fully understood in great detail. It will be noted that the location (LOC) column on the left hand side of the program of Exhibit "A" identifies memory locations of ROM 57 which are also liberally identified on the flow charts of FIGS. 6–8. Each line of the program identifies the contents of sixteen consecutive memory locations beginning with the location in the LOC column. All representations are hexadecimal numerals, and recognized by the RCA 1802 microprocessor preferred in the present invention. But so that the general reader will obtain an understanding of the program of CPU 55, its flow charts of FIGS. 6–8 are described generally.

FIG. 6 shows a block diagram illustrating the logical sequence of initialization instructions executed by CPU 55 of FIG. 5. Request box 100 indicates that two internal registers of the CPU 55 are being dedicated as the main program counter register, which will contain the address of the program instructions contained in ROM 57 (FIG. 5), and the data pointer register, which will contain the address of the locations of stored data within RAM 64 (FIG. 5). Concurrently with the selection of registers, the INT input of CPU 55 is disabled until the initialization routine is completed, during which no data is to be applied to the tristate buffer 63 (FIG. 5). Once the main program counter register has been initialized, the sequence of instructions of request box 102 will clear and set the remaining internal registers of CPU 55. These registers are utilized by various subroutines, hereinafter described.

Decision box 104 indicates that RAM 64 will be scanned in the locations reserved for an address means. If a universal address code is not located in RAM 64, request box 106 indicates that the universal address code will be obtained by CPU 55 generating a memory address over address bus 56 (FIG. 5) to be applied to a location in ROM 57 containing the universal address code. The universal address signal is then placed on data bus 58 (FIG. 5), and applied to RAM 64 upon the generation of a memory address by CPU 55 specifying the location where such universal address code is to be stored. The sequence of operations of request box 106 are not executed if the universal address code has heretofore been stored in RAM 64.

The CPU 55 executes the instruction set of request box 108 clearing working locations in RAM 64 for various subroutines hereinafter described.

After specified locations in RAM 64 are cleared, the instructions of request box 110 indicate that data is read from ROM 57 and stored in RAM 64. This data initializes values for processing by subroutines, hereinafter described, controlling the aforementioned reception duty cycle means.

Upon the completion of the instructions contained in request box 110, the control of CPU 55 becomes governed by the main executive routine (EXEC) illustrated by program box 112.

FIG. 7 shows a block diagram illustrating the logical sequence of instructions of the main executive routine of program box 112 of FIG. 6. Request box 120 indicates that the INT input to CPU 55 (FIG. 5) is disabled; furthermore, the execution of the EXEC logic is synchronized with the negative pulse generated by capacitor 61 (FIG. 5), the operation of which has heretofore been fully described.

Input-output box 121 indicates that CPU 55 will generate a high binary logic level at the SLEEP output. Upon the occurrence of the negative pulse generated by capacitor 61 and the responsive pulse thereto applied to the PAUSE input of CPU 55, execution of the EXEC logic is synchronized with said pulse. The timing for the reception duty cycle means is derivative from said pulse, and furthermore, during the active portion thereof, EXEC logic is executed, determining if any action should be taken, either under program control or user control. The program controlled actions, hereinafter described, are generally internal management subroutines whereas the user controlled actions occur when the user desires information, such as the display of a message stored in RAM 64 (FIG. 5). After the above actions are completed, if necessary, a decision is made whether the reception duty cycle means should sequentially activate the receiver 11 for the first time period and deactivate receiver 11 for the second time period (determined by Q13), or whether control means should be operative to extend the first time period to receive a data train. The EXEC logic governing the control means is cycled for each character of incoming data and will continue until the entire data train has been monitored, providing that the header 21 (FIG. 2a) contains an address signal 25 to which personal receiver 11 is responsive. The EXEC logic executed during the first time period of the reception duty cycle means is set forth in detail as follows.

Request box 122 indicates that visual alphanumeric display 13 (FIG. 1) will be supplied battery power during the active portion of the reception duty cycle. However, the data inputs to display 13 will be in an unknown state. To prevent the unwanted display of extraneous characters, the instructions of request box 122 are executed to cause binary encoded blanks to be retrieved from ROM 57 (FIG. 5) and applied to display 13.

Upon completion of the display blanking, CPU 55 must then determine the sequence of events, if any, to be performed within personal receiver 11. The events to be performed are determined by the instructions of request box 124. A plurality of register or memory locations within CPU 55 or RAM 64, respectively, are decremented each time the instructions of request box 124 are executed. Should any of these locations be decremented to zero, additional instructions are executed to indicate that a certain event is to be performed. In one embodiment of the present invention, there are five events controlled by these locations which serve as program controlled timers. The first event is controlled by a sleep/wake timer which contains an initial value determined by request box 110 (FIG. 6), and which provides the reception duty cycle means with related information concerning the first and second time periods. In the normal mode of operation, the sleep/wake timer is equal initially to the time duration of the plurality of synch signals 22 (FIG. 2) divided by a constant determined so that the timer will be decremented to zero at least one time during the time period required for the transmission of synch signals 22. The event performed is the active monitoring of possible data trains.

A second event is controlled by the out-of-range timer, being an out-of-range warning means, which upon being decremented to zero will warn the user of personal receiver 11 that that personal receiver 11 is out of range of the transmitting antenna 16 (FIG. 1). The out-of-range timer is initialized by the instructions of request box 110 (FIG. 6) and this initial value will be restored or modified upon the reception of data train 33 (FIG. 2), hereinabove described.

The third event is controlled by the drift timer, the value of which is responsive to and initially equal to drift signal 29 (FIG. 2). A transmission system 10 (FIG. 1) may transmit sequential, repeated data trains. The received message portion 30 (FIG. 2) may contain uncorrectable errors in transmission which can be corrected by EXEC logic by comparing the received data with new data of a repeated transmission. Active monitoring of repeated data trains will be maintained until the drift timer is decremented to zero, which signifies end of all transmissions of the data train, or until the received message contains no errors in which event the second time period is extended commensurate with drift signal 29. In the latter situation, the EXEC logic increments the sleep/wake timer by the value remaining in the drift timer, and the control means is deactivated during the remainder of the repeated transmissions of data trains which are not necessary when the received message contains no errors. The drift timer in combination with the sleep/wake timer define the control means.

The remaining events controlled by timers are for internal management of sequencing the rate at which characters of messages are applied to display 13 or the rate an audible alert, such as a beeper, will be activated. The described function occurs when the timer is decremented to zero.

Upon completion of the instructions of request box 124, control of CPU 55 is governed by the instructions of request box 126, which are executed only when a message, either received and stored in RAM 57 or prestored in ROM 57, is to be applied to display 13. The decision controlling execution of these instructions is governed by the data generated by the execution of these instructions of request box 128. A plurality of manually operable external switches on personal receiver 11 generates signals which are applied directly to input ports (not shown) of CPU 55. The instructions of request box 128 perform the function requested by the activated switch. In one embodiment of the present invention, four external switches are utilized. Activation of the first switch causes execution of instructions necessary to retrieve the first received message stored in RAM 64 to be displayed on display 13. The second switch causes execution of the logic necessary to display a prestored message in ROM 57 to be displayed should the EXEC logic determine that one of the prestored messages is appropriate, such as the out-of-range message hereinabove discussed. Additional prestored messages are discussed hereinafter. Logic responsive to the third switch will rotate the display order of received messages in RAM 64 enabling the recipient of messages to selectively view any message contained in RAM 64. The fourth switch clears an active display or stops an active alert(s). The fourth switch, when activated simultaneously with the first switch, will erase the last displayed message from RAM 64, enabling selective deletion of any message contained therein. The switches in combination with RAM 64 define a message means.

Upon the completion of the instructions of request box 128, the EXEC logic must determine if the personal receiver 11 should be placed in the first time period of the reception duty cycle means. Decision box 130 contains instructions to decide whether the sleep/wake timer, described above, has been decremented to zero, and if so, personal receiver 11 is placed into the active portion (first time period) of the reception duty cycle means. During this active portion, the INT input to CPU 55 will be enabled to allow data to be applied to the tristate buffer 63 as controlled by the interrupt service routine, hereinafter described. However, only the possible transmission of synch signals 22 is monitored during the usual active portion of the reception duty cycle means. When synch signals 22 have been recognized, the first time period is changed by the control means, to receive in sequence, the remaining signals of header 21.

Should decision box 130 determine an event is to be performed based on the hereinabove described timers, the instructions of request box 132 are executed. The events are queued and processed so that only one such event is performed each time the instructions of request box 132 are executed should two or more of the aforementioned timers be simultaneously decremented to zero. Each timer has a corresponding queue which is set upon the timer being decremented to zero. Each queue, in the preferred embodiment of the present invention, is a binary data bit contained in an internal register of CPU 55 dedicated for queue processing.

Upon the completion of the instructions of request box 132, the instruction of request box 134 may be executed if a hard copy printer is connected to the personal receiver 11 and more particularly to the appropriate output (not shown) of CPU 55. Execution of the logic of request box 134 is repeated until each data bit of message has been addressed at its location in the message means placed on the data bus 58 and stored in the accumulator of the CPU 55. When a character of message text has been formed, the contents of the accumulator of CPU 55 is applied to a hard copy printer.

Upon completion of the instructions of request box 134, CPU 55 determines if the interrupt service routine, hereinafter described, has made data available for processing by the EXEC logic of request box 136. Data is available for processing upon the reception of a synch signal 22 (FIG. 2), and thereafter upon the reception of a completed character of any signal within header 21 or message portion 30. The instructions of request box 136 is state dependent on the logic of request box 138. The state dependency enables the EXEC program to determine if the incoming data is one of the plurality of signals contained in header 21 of message portion 30. The state enables the control means to determine whether receiver 11 should be activated to receive the next header signal. In one embodiment of the present invention, the state assignments are negative when no data train has been received and becomes positive upon recognition of a synch signal 22. Each of the remaining signals, when recognized, increments the state. The state determines which signal is to be expected in the incoming data train. The control means is responsive to the state and operative to extend either the first or second time periods determined by the state assignment. The state comprises, generally, a plurality of binary logic levels, and preferably is an eight bit value located in a dedicated register internal to CPU 55.

When three of said synch signals 22 have been recognized, the first time period of reception duty cycle means is extended and receiver 11 is enabled for the continuous reception of the remaining data train. The instruction set of request box 136 is executed every time the interrupt service routine, hereinafter described, makes data available for processing.

The logic of request box 136 is also able to detect and correct errors in transmission of the header 21 for those signals which are format encoded in the aforementioned Hamming code. Errors in said message portion 30 are detected by said parity check signal 31 described above. Instructions of request box 136 will also generate a parity check signal internal to personal receiver 11. The internally developed parity check signal and received parity check signal 31 are then compared at the completion of the reception of the data train. If the two signals are not equal, and no subsequent repeated transmissions of the data train are forthcoming, the recipient of message 30 will then be warned that the viewed message contains an unspecified error. However, if repeated data trains are forthcoming, each character of the new message portion 30 will be compared with the stored characters of the previous message, each character corrected if necessary, and a new internal parity check signal will be generated. When the parity check signal 31 and the internally generated parity check signal are equal, the stored message is treated as if error free. The comparison of repeated data trains and more particularly the message portion 30 thereof, is continued until both parity check signals are equal or until the drift timer is decremented to zero. The instructions for generating the parity check signal is contained in locations OCDA through OD44 of request box 138. Thus, the control means is responsive to parity check signal 31.

The instructions of request box 136 is also responsive to the length of message signal 28 and determines the amount of free memory available in the message means in which to store the incoming message portion 30. However, logic of request box 138 is also responsive message type signal 27e (FIG. 2) which develops a state that will allow the message storage locations of the message means to be overwritten with a message text 30j (FIG. 2).

After the instructions of request box 136 have been executed, a decision must be made if the first time period is to be maintained or terminated and the second time period extended as indicated by decision box 140. The decision if dependent on the state value generated by the logic of request box 138, and should the state value indicate that further data is expected, as hereinabove described, the first time period is extended. A unit timer, hereinafter described, is queried, and control of the CPU 55 is governed as indicated by decision box 142. However, if the state value at decision box 140 indicates that the second time period can be resumed, the control of CPU 55 is returned to the beginning of the main executive routine and more particularly to request box 120. RAM 64 in combination with the instructions of request box 136 also define the address means.

Whenever capacitor 70 (FIG. 5) generates a negative pulse and such pulse is applied to the INT input of CPU 55 when the EXEC routine has enabled interrupts to occur, the control of the CPU 55 is governed by the interrupt service routine of FIG. 8. The interrupt service routine enables the incoming data train to be serially applied to tristate buffer 63 until one character is formed. This character is then compared with the known synch signal 22 configuration. When synch signal 22 has been received and recognized, the interrupt service routine will signify that data is available to the EXEC routine and more particularly to request box 136 of FIG. 7. The instructions of the interrupt service routine is hereinafter set forth in detail.

Request box 150 indicates that contents of the registers internal to CPU 55 are stored in RAM 64 for future reference. The registers are restored to these values upon completion of the interrupt service routine to enable return of the execution of the EXEC logic at the location where interrupted.

After the contents of the registers have been saved, control of CPU 55 is governed by the instructions of request box 152 which indicates that the current data bit of the data train has been applied to tristate buffer 63 and stored in a working location of RAM 64.

A decision must be made by CPU 55 as indicated by decision box 154, which inquires the state value generated by request box 138 (FIG. 7). Should the state value be equal to zero, the instructions of the interrupt service routine determines if the accumulated data bits have formed synch signal 22. If synch signal 22 is found as indicated by decision box 156, the state value is incremented to one, as indicated by request box 158. Request box 160 is then executed to indicate to the EXEC logic that data is available for processing by request box 136 (FIG. 7).

Should the instructions of decision box 154 indicate that the state value is not equal to zero, the state is reexamined by decision box 162 to determine if the state value is positive or negative. In one embodiment of the present invention, a negative state value indicates that no data train is being received by personal receiver 1 and a positive state value indicates that the EXEC logic is expected to receive further data as hereinabove described.

After the state value has been determined by decision box 162, and assuming it is found to have a positive state value, a decision is made whether the accumulated data bits have formed the next character of the data train. Decision box 164 indicates that, should a character have been formed, this new character is to be made available to the EXEC logic for processing. Otherwise, data bits are collected and stored in the working locations of RAM 64 until the next character has been formed.

After the above decisions have been made, and the appropriate instructions executed, the instructions of request box 166 are executed. These instructions decrement the unit timer which includes a plurality of binary logic levels. In one embodiment of the present invention, the unit timer includes eight bits of information contained in an internal register of CPU 55 (FIG. 5). The unit timer is decremented each time the interrupt service routine is entered, and therefore responsive to the Q8 output of secondary binary ripple counter 45 (FIG. 4). Preferably, the unit timer has an initial value of eight that is decremented to zero, which indicates that the unit timer fired, and reset to eight again.

After the unit timer has been decremented, a decision is made, as indicated by decision box 168, whether the unit timer is at a zero or non-zero value. Should the unit timer be at a non-zero value, control of CPU 55 is governed by the instructions of request box 170. The logic of request box 170 restores the registers of the CPU 55 to the values contained therein at the moment of entry into the interrupt service routine. Control of the CPU 55 is returned to the EXEC routine of FIG. 7.

The decision, should the unit timer have been decremented to zero, will cause execution of the logic of request box 172 which restores the unit timer to its high value. Request box 174 indicates that the unit timer has fired and this information is saved for the determination to be made by decision box 142 of FIG. 7.

The above logical flow charts of FIGS. 6, 7, and 8, have been described with respect to a preferred embodiment thereof, but it will be understood that the invention is entitled to protection within the full scope of the claims which follow the appended computer program marked as Exhibit "A".

EXHIBIT "A"

```
0000=71 20 C0 08 85 72 B3 72 F3 FB FF 76 94 7F 00 B4
0010=3A 19 F8 08 B4 85 F9 08 A5 22 72 52 FE 12 72 70
0020=22 78 22 73 22 6C 76 73 93 73 F8 04 B3 F0 76 52
0030=84 3A 53 F0 FB D4 3A 66 14 22 F8 F6 A3 85 FA 09
0040=F1 A5 12 F0 85 91 73 52 85 F6 85 C7 F9 02 F9 01
0050=A5 30 65 FE 33 66 F0 FE E3 22 3B 5F 02 F3 52 72
0060=E2 FB 80 32 3A 12 12 30 05 E0 71 20 97 FA 7F B7
0070=92 BC F8 FB AC 91 5C A5 7A E1 6A F8 1F A8 E8 F8
0080=20 B8 73 73 73 73 73 73 73 73 73 73 73 73 73 73
0090=73 73 73 73 73 73 F8 08 B4 A8 58 30 B0 85 F6 C3
00A0=07 7D FA 04 C2 02 5C E0 71 00 85 FA F7 A5 70 20
00B0=F8 09 B8 F8 E9 A8 92 BC F8 ED AC D8 3A E2 97 FA
00C0=10 32 C9 97 FA EF B7 30 E2 97 F9 10 B7 2C F8 01
00D0=5C 89 FE 3B D8 F6 A9 F8 0B 30 D0 1C 91 A4 97 F9
00E0=80 B7 D8 CA 01 1D 89 F6 C3 01 13 19 92 BA 96 FA
00F0=10 CA 01 13 F8 E5 AA 0A FA FD F9 01 5A 87 C4 30
0100=01 FA 10 3A 0B 87 FA 1B F9 A0 A7 97 F9 80 B7 99
0110=F9 40 B9 4C 52 0C 2C 2C 73 02 5C 1C 1C 1C 1C D8
0120=3A AA 97 FA 20 32 37 97 FA CF F9 80 B7 F8 FC A4
0130=F8 EE AC 91 5C 30 AA F8 20 B8 BA F8 08 A8 87 FA
0140=10 58 32 AA 87 F9 08 A7 97 F9 80 B7 60 F0 AA 2C
0150=F0 C6 F8 28 FF 01 73 52 87 FA 20 3A 60 F8 04 C8
0160=F8 01 5C 02 3A 8A F8 20 5A AA 91 73 87 FA F7 A7
0170=FE 3B 76 FE 3B 8F 87 FA BF A7 FA 04 32 84 87 FA
0180=EF A7 30 87 F8 1A 5C 60 30 9C F6 33 A0 30 9C 87
0190=F9 40 A7 F8 10 60 73 30 87 F8 07 5C F8 20 30 A4
01A0=28 2A F8 2A 58 5A 60 60 8A 5C 86 32 B7 97 FA 40
01B0=32 BA 87 F6 3B B7 26 C0 02 5C 26 86 3A B7 92 BC
01C0=F8 E8 AC 0C 32 F8 A8 FE 3B D2 90 5C A8 96 FA 02
01D0=32 FE 1C 28 4C BA 0C AA 2C F8 03 B8 99 F6 3B F5
01E0=88 3A E7 F8 30 30 F6 FB 15 3A F5 2C 5C F8 09 BB
01F0=F8 5D AB 30 F8 08 A8 D8 96 FA 02 CA 07 27 92 30
0200=01 BA F8 FF AA 87 F6 33 46 0B FE 3B 18 99 FA 14
0210=3A 5C 99 F9 02 B9 30 5C 0B FB 0D 32 37 0A AD 4B
0220=52 FA 40 32 29 02 FA DF 52 02 5D 20 8D 5A FB 0B
0230=3A 5B 0B FB 0D 3A 38 1B F8 26 A6 17 87 FA 02 32
0240=5C F8 FE A6 30 5C 87 FA FD A7 F8 20 BD F8 1F AD
0250=5A F8 20 5D 20 8D FB 0B 3A 51 27 16 E2 97 FA 0F
0260=B8 89 F6 F6 3B 6D 89 FA FD A9 90 30 7E 91 3C 72
0270=F9 01 3D 76 F9 02 3E 7A F9 04 3F 7E F9 08 A8 52
0280=32 8C 33 B8 87 FA E7 A7 97 F9 80 B7 98 F3 32 B0
0290=98 32 B9 FB 08 3A 9C 88 FB 09 32 C7 98 FB 09 3A
02A0=A6 88 F8 08 32 B3 88 52 97 FA F0 F1 B7 C0 04 00
02B0=88 3A AD 96 FA FE B6 30 A6 96 F6 33 A6 96 F9 01
02C0=B6 88 FF 09 33 A6 88 AC 92 BA F8 E5 AA 99 FA 10
02D0=32 F4 99 FA EF B9 91 5A 0E FE FE 33 E8 FE 3B E8
02E0=8C FB 08 32 E8 F8 01 AC 88 52 97 FA F0 F1 B7 8C
02F0=A8 C0 03 F7 0A 32 D8 99 F9 10 89 F8 08 30 E7 FF
0300=16 5E 63 69 5E 70 7D 5E 80 84 91 98 9C 5E A1 A5
0310=5E 98 AA B6 BA BE 0E FE FE 33 BE FA 20 32 BE 96
0320=FA 04 32 30 1A 1A 1A 1A 9A 5C 1C 8A 5C 2C 30 BE
0330=0A FA 03 52 1A 1A 0A FA 03 FE FE E2 F1 52 91 AB
```

```
0340=02 FF 0A 1B 33 41 2B FC 0A 1C 1C 5C 8B FC 30 1C
0350=5C 9C BB 8C AB 2C 2C 2C 2C 0C FC 01 5C D0 1C 1C
0360=0C 30 4D F8 2F 1C 1C 30 4F 0A FA 7C F6 F6 30 3D
0370=F8 2F 52 1A 9A 5C 1C 8A 5C 2C 02 30 65 0A 30 3D
0380=F8 20 30 72 99 F6 3B 98 89 F6 F8 49 C7 F8 4F 30
0390=65 99 F6 F8 52 C7 30 65 F8 20 30 65 0A FA 3C 30
03A0=6C F8 3A 30 72 0A FA 3F 30 3D 0A FA 40 3A B2 F8
03B0=41 C8 F8 50 30 65 F8 4D 30 72 F8 0D 30 65 4C BB
03C0=0C AB 2C 91 2C 5C 30 5D 99 FA A0 32 F4 FA 20 3A
03D0=F4 97 FA 40 3A F4 94 A6 97 F9 40 87 9E BB 8E AB
03E0=1B 1B 1B 92 BC F8 EA AC EC 88 73 9B 73 F8 FF 5C
03F0=99 F9 20 B9 C0 07 08 F8 0C B8 08 A8 F8 04 B8 D8
0400=97 FE CB 00 78 E0 70 20 92 BC F8 FA AC 0C FA 1E
0410=52 97 FE FE 96 FA E1 F1 B6 FA 02 32 3A 86 32 2E
0420=33 2E 99 FA 58 B9 91 A6 97 FA BF 87 30 3C F8 E5
0430=AC 0C 32 3C 99 C6 F9 10 B9 C8 33 22 C0 05 00 99
0440=FA 08 B9 9E BB 8E AB 0E FE FE 33 53 0B FA DF 5B
0450=1B 1B 1B 92 BC F8 EA AC EC 88 73 9B 73 F8 FF 5C
0460=30 C1 86 3A 72 99 FA 08 F9 01 B9 F8 10 BB 91 AB
0470=30 53 96 FA 02 3A F5 87 FB 02 A7 F6 3B F5 87 FA
0480=02 3A 86 F8 01 38 82 A6 D0 0E FE FE 33 3F 9E BC
0490=8E AC EC 72 FA 07 52 8E F4 AE E2 9E 74 BE 0E FE
04A0=FE 3B 3F F8 10 BE 98 AE 30 3F 99 FA 18 F9 04 B9
04B0=96 FA DF B6 F8 09 BB F8 5D AB 92 BC F8 E8 AC 91
04C0=5C 91 2C 5C 2C 5C 87 FA FC A7 17 96 FA 02 3A D8
04D0=F8 01 A6 97 FA BF B7 D0 97 F9 40 87 F8 02 A6 91
04E0=AD 92 BA F8 FF AA F8 14 5A D0 0E FA 20 3A 3F 99
04F0=FA 08 F9 20 B9 D0 F0 B0 D0 E0 90 A0 C0 80 FF FF
0500=85 F6 C3 07 7D 99 32 EF FE FE 3B 37 FA 58 3A 37
0510=97 FA 20 3A 37 97 FA 40 3A 1D 86 3A 37 99 FA BF
0520=B9 87 F9 10 A7 92 BC F8 F6 AC EC F8 20 73 91 73
0530=F8 01 73 91 73 30 EF 99 FA 08 32 75 99 FA F7 B9
0540=89 F6 3B 67 FE A9 92 BA 96 FA 10 3A 67 F8 E5 AA
0550=0A FA FE F9 02 5A 87 FA F0 FB 10 32 63 87 FA 1F
0560=F9 24 A7 99 F9 40 B9 F8 F1 AA 4A 52 0A 2A 2A EA
0570=73 02 5A 30 EF 99 FA 20 32 F2 99 FA 17 3A F2 84
0580=FC 03 3B F2 97 FA 60 3A F2 92 BA F8 E6 AA 9E BF
0590=BC 8E AF AC 0C FE FE 33 D8 1C 1C 1C EC 72 FE 3B
05A0=9D FE 33 CD 2C 7B 72 5F 1F 72 5F 1F 72 5F 1F 38
05B0=1F 4C 5F FE 3B B0 FE 3B A8 92 BC F8 E2 AC 8F 73
05C0=9F 5C 99 FA 80 3A E5 1A 0A F9 E0 30 E0 F8 C0 5F
05D0=F8 10 BE F8 04 AE 30 B9 0A F9 02 5A 1A 0A F9 C0
05E0=5A 99 F9 04 B9 99 FA 5F F9 03 B9 96 F9 20 B6 C0
05F0=07 08 92 BC 86 3A EF 97 FA 40 3A EF 99 FA 14 32
0600=7B C4 C4 C4 C4 99 FA 10 32 27 F8 E5 AC 0C 3A 1D
0610=99 FA EF B9 FE 33 7B 89 F9 02 A9 30 78 52 91 AA
0620=F8 0D BA BB 02 30 33 F8 E6 AC 91 AA F8 09 BA 0C
0630=32 6D 52 F6 CF 1A F6 CF 1A F6 CF 1A F6 CF 1A F6
0640=CF 1A F6 CF 1A F6 CF 1A C4 8A A8 F8 07 B8 E2 08
0650=F3 5C 0A AB F8 09 BB 96 FA 02 3A 66 0B FB 0D 32
0660=78 F8 01 A6 30 78 97 F9 40 B7 94 30 63 1C F8 0D
0670=BA 0C 3A 32 99 FA FB B9 C0 07 08 99 FA 02 C2 03
0680=C8 92 BC F8 E6 AC E2 9E BA 8E AA 4A 1A FE FE 3B
0690=97 F8 02 5C 52 30 EA 99 F6 33 9F 0A FA 2C 5C 2A
06A0=2A 30 B3 1A 0A 2A 52 8A F4 A8 0A FA 07 52 9A 74
06B0=BA 88 AA 0A FE FE 33 EA FE 3B A3 96 FA 20 3A C9
06C0=99 FE 33 EA 96 FA 02 32 D1 9A BE 8A AE 99 FE 33
```

```
06D0=EA 99 F9 40 B9 87 FA 1B A7 0C F9 80 5C 96 FA 02
06E0=32 EA 99 F9 80 B9 87 F9 04 A7 89 FA 50 32 F3 52
06F0=0C F1 5C 1C F8 C0 5C 92 B8 F8 E3 C0 0F D6 FF FF
0700=01 02 04 08 10 20 40 80 97 FA 40 32 7D 87 F6 3B
0710=17 86 3A 7D 27 30 1E 94 52 E2 86 F3 32 7D 8D 3A
0720=27 99 FA 14 C2 01 BE 94 A6 92 BA F8 FF AA 8D 32
0730=34 9D 30 6D 0B FE 3B 49 91 A6 97 FA BF B7 99 FA
0740=14 3A 7D 99 F9 02 B9 30 7D 0A 3A 5B 4B FB 0D 32
0750=52 2B F8 14 5A 17 F8 1E A6 30 7D F8 08 AD 0B FB
0760=0D 3A 68 5A F8 0D 30 6D 0A FF 01 5A 4B 2D 76 BD
0770=E0 71 C0 61 3B 7A C4 C4 C4 61 E0 70 20 E2 84 FB
0780=FC 32 D3 85 F6 7A CB 08 33 96 FE 3B C9 92 BC F8
0790=D7 AC 4C BA 0C AA 2A 8A 5C 52 2C 9A 5C F1 2C C6
07A0=82 5C 2F 9F 52 8F F1 3A FF 96 FA 7F B6 C0 08 01
07B0=FE 33 B7 7B 82 30 D1 7E 7E 7E 7E FA 07 A8 F8 0F
07C0=88 08 52 95 F3 FA 0F 30 D1 85 FA F0 3A B0 95 FA
07D0=0F 52 84 A8 FE 33 FF F8 0A AA B8 08 A8 84 FE 33
07E0=F8 84 FF 09 3B FB 1A FF 07 3B FB 1A FF 0C 3B FB
07F0=1A FF 04 3B FB 1A FF 1B 3B FB 1A E2 8A B8 D8 30
0800=23 92 BF F8 D5 AF 4F FB 01 3A 10 89 FA 40 32 1D
0810=0F FA 07 FF 05 33 1D FC 40 A4 C0 07 D2 82 A4 97
0820=FA DF B7 7A E0 71 00 85 F6 F6 85 FA FC A5 70 00
0830=3B 33 7B 92 BC F8 DF AC 4C BA 4C AA 4C B8 4C A8
0840=52 8A E2 F7 A8 98 52 9A 77 B8 88 FF 0F A8 98 7F
0850=00 B8 FE 3B 5A 89 F9 10 30 5D 89 FA EF A9 18 98
0860=5C 1C 88 5C 39 6E 7A 84 FB 3B 32 1A 30 1D 84 AA
0870=32 79 FE 3B B2 FB F8 32 B2 97 FA 50 3A B2 8A 3A
0880=8B 94 FB 05 3A B2 F8 FF A4 30 90 FB FE 3A 98 14
0890=92 BC F8 EE AC F8 0D 5C 86 3A B2 97 FA 0F 3A B2
08A0=99 3A B2 87 FA 08 3A B2 94 F6 32 82 85 FA 08 C2
08B0=00 69 C0 00 9D F8 00 B1 F8 20 A1 BC F8 13 B2 F8
08C0=FE A2 F8 10 BE F8 04 AE 91 A6 B7 A9 A7 F8 FF A4
08D0=F8 16 AC F8 2A 5C 80 BA 2A 9A 3A D8 90 AC 5C 92
08E0=BC BB F8 DF AC F8 0F BF F8 F9 AF F8 D0 AB EB 0F
08F0=F3 32 F4 7B 4F 73 FB 7F 3A EF 9B 5C 1C C0 09 AA
0900=5D 45 10 50 19 25 34 08 2A 4D 4F 52 45 2A 0D 80
0910=2A 45 52 52 4F 52 2A 0D 80 2A 4D 45 4D 20 46 55
0920=4C 4C 2A 0D 80 2A 50 41 52 54 49 41 4C 20 4D 53
0930=47 2A 0D 80 2A 53 45 52 56 49 43 45 20 52 45 51
0940=27 44 2A 0D 80 2A 4E 4F 20 4D 53 47 53 2A 0D 80
0950=2A 55 52 47 45 4E 54 20 4D 53 47 2A 0D 80 2A 4F
0960=55 54 2D 4F 46 2D 52 41 4E 47 45 2A 0D 80 2A 49
0970=4E 2D 52 41 4E 47 45 2A 0D 80 2A 4D 53 47 20 4C
0980=4F 53 54 2A 0D 80 2A 4D 45 4D 20 4C 4F 57 2A 0D
0990=80 2A 49 44 20 4D 41 58 2A 0D 80 2A 4D 53 47 20
09A0=43 4C 45 41 52 45 44 2A 0D 80 31 B0 37 B5 30 BE
09B0=8B 5C F8 8F 5B F8 C0 5E 1C 9E 5C 1C 8E 5C 0B FB
09C0=8F 3A C6 F8 40 A9 19 F8 FF AC EC 91 73 8C FB E4
09D0=3A CB F8 F2 AC 90 73 73 73 73 73 91 73 F8 03 B9
09E0=F8 20 B6 C0 00 69 92 60 D0 EC 72 F1 32 E6 F0 3A
09F0=F8 2C F0 FF 01 5C 60 F0 FF 01 73 F1 60 30 E7 FF
0A00=E2 81 40 4A 4A 83 83 83 C7 F0 F7 F0 F7 F0 F7 F0
0A10=09 12 23 31 40 50 55 66 8B 94 AB AB 26 AF CC D1
0A20=6F 6F 5B 67 71 70 70 70 70 70 70 7F 9A 90 C3 DC
0A30=E2 DC E2 DC E2 DC E2 E6 F4 FE FE 08 C6 B8 B8 08
0A40=31 47 02 FB 04 32 51 91 A4 D0 31 58 02 FB 04 3A
0A50=55 F8 04 A4 D0 FB 0B CE 24 D0 89 FA D7 A9 97 FA
```

```
0A60=EF B7 92 BC F8 ED AC 91 5C 1C 5C F8 36 A4 92 BF
0A70=F8 D2 AF 91 5F 2F 91 5F 8F FF 06 AF 0F FB 8F 3A
0A80=76 14 D0 92 BC EC 89 FA 28 32 A7 F8 D4 AC 96 FA
0A90=40 32 9A 02 5C 96 FA BF B6 D0 96 F9 40 B6 02 F3
0AA0=32 A7 7B 02 F9 80 52 84 F6 3B E5 F8 D3 AC 02 FB
0AB0=0F 3A C1 84 FB 05 3A BC F8 1C A4 D0 F8 7F C0 0B
0AC0=06 02 5C F8 06 A4 D0 02 FB 0F 3A 81 F8 11 A4 89
0AD0=FA FB A9 97 FA 20 32 E1 92 BC F8 F4 AC EC 91 73
0AE0=5C D0 C0 0D 43 92 BF F8 D3 AC 0C FE 33 F1 C9 0B
0AF0=00 F8 FF B3 89 FA 28 3A FD 89 F9 04 A9 C0 0B 07
0B00=02 FE FE FE FE F1 B3 7A 2C 0C FC 01 BA 73 FB 06
0B10=32 40 F8 01 AA 30 1C 1A 8C FF 06 AC E2 9A 52 8C
0B20=F7 AF 0C 32 48 FB 8F 3A 17 89 FA 08 3A 71 84 FB
0B30=06 32 67 89 FA 20 3A 69 31 67 F8 04 A4 C0 0A 6E
0B40=89 FA 28 C2 0E 10 30 88 93 EF F3 5C 32 52 92 5C
0B50=30 17 7B 0F FB 7F 3A 17 89 FA 08 3A 69 89 FA 20
0B60=3A 9F F8 D5 AF 8A 5F 14 D0 97 FA 20 3A D2 C0 0E
0B70=00 93 FB FF 32 88 93 5F FB 7F 3A 67 8A FB 0D 3A
0B80=8B F8 E5 AC 0C F9 10 5C C0 0E 1D 97 FA 20 3A D2
0B90=7B 5C 8C FF 06 AC F8 8F 5C 89 FA BF A9 30 CB 97
0BA0=FA 20 3A D2 E2 F8 D5 AF 4F 52 FB 02 32 B2 8A F3
0BB0=3A 6E 0F F6 F6 33 D4 8A FD 02 33 6E 8C FF 06 AF
0BC0=7B C8 2C 2F 0F 5C FB 8F 3A C2 5F 92 BF F8 E0 AF
0BD0=8C 5F 30 EC 8A F3 3A 6E 7B F8 CB AF 0F FB 8F 32
0BE0=EC F8 E0 AC 8F FF 06 AF 5C F8 8F 5F F8 3B A4 D0
0BF0=02 FB 0F 3A 67 30 88 02 FB 0F 3A 67 F8 08 A4 D0
0C00=EA 3F 62 F5 89 F5 F5 F5 AA 02 FB 0F C2 0B FC C0
0C10=0E 1D 92 BF F8 D6 AF 97 FA 20 3A 20 31 0F 02 5F
0C20=1F 14 D0 97 FA 20 3A 2E 31 0F 02 FA 07 5F 1F 14
0C30=D0 97 FA 20 3A 21 31 0F 02 FE FE FE FE 5F 14 D0
0C40=97 FA 20 3A 4B 31 0F 02 EF F1 5F 1F 1F 1F 14 D0
0C50=02 5F 1F 14 D0 31 60 02 FE FE FE FE 5F 2F 14 D0
0C60=2F F8 80 5F 14 D0 31 84 0F FE 33 84 1F EF 02 F1
0C70=5F F8 D6 AF 0F FA 08 3A 7C 10 10 D0 F8 DD AF F8
0C80=FF 5F 14 D0 91 5F 1F F8 BC 30 70 31 0F 0F FC 01
0C90=5F 1F 30 38 31 0F EF 02 F1 5F 2F 3A A1 F8 18 A4
0CA0=D0 AC 0F BF 8C AF 96 F9 80 B6 D0 92 BC F8 E1 AC
0CB0=4C BA 0C AA 1A 1A F8 D3 AC 84 F6 C3 0D 28 85 FE
0CC0=95 FA 7F C7 F8 7F B3 97 FA 20 32 D5 C4 C4 C4 C4
0CD0=C4 93 FB 7F CE 93 5F 0F FB 7F 3A E0 0A F9 04 5A
0CE0=EC F8 08 A0 0F 52 02 FE C7 FB 06 FC 00 52 20 80
0CF0=3A E6 02 F6 F3 5C F8 FF A0 F8 D9 C0 0D 08 FF FF
0D00=5E 6E 7A 86 91 9B A8 A8 AC 4C BA 0C AA 2A 9A 52
0D10=8A E2 F1 32 1C 8A 5C 2C 9A 5C 1F D0 0F FB 0D CE
0D20=98 5F 1F F8 C0 5F 14 D0 85 FE 33 34 95 FA 7F 52
0D30=0C F3 32 3B 0A F9 04 5A C0 0E 34 97 FA DF B7 F8
0D40=FC A4 D0 7B 92 BA F8 E5 AA 89 FA 10 3A A9 92 BC
0D50=F8 E1 AC 4C BF 0C AF 0F FA BF 5F 1F 1F 0F 1F FA
0D60=08 32 68 9F BE F8 04 AE 0F FE 33 76 FB FE 3A 73
0D70=F8 2A 5F 1F 30 68 8F 5C 2C 9F 5C 89 FA FB A9 87
0D80=FA 1B A7 99 FE 33 9E 99 FA 18 F9 43 B9 96 F9 20
0D90=86 FA 02 32 A2 89 FA 10 3A 9E 99 F9 80 B9 87 F9
0DA0=04 A7 0A FA 3C 5A C0 0E 00 0A F9 04 5A 30 7B 31
0DB0=D1 02 AC FA 07 52 8C FA 08 C2 0E 5D 89 FA 04 3A
0DC0=C5 F8 20 A4 D0 89 FA FB A9 82 A4 D0 31 D1 C0 0E
0DD0=69 C1 0E 10 C0 0E 73 2F 4F FA 07 F6 BC 0F 76 AC
0DE0=9C F6 BC 8C 76 AC 89 F9 80 A9 F8 FF A4 9C 3A F1
```

```
0DF0=1C 92 BF F8 ED AF 9C 5F 1F 8C 5F D0 FF FF FF FF
0E00=F8 DB AF 92 BF 4F BC 0F AC C0 0D EA F8 D9 30 02
0E10=91 BC F8 4B AC 97 F9 10 B7 91 C0 0D EC 97 FA 20
0E20=3A 28 89 F9 04 A9 30 58 89 FA 28 3A 34 7B 91 BC
0E30=F8 BC AC 38 7A 92 BF F8 DB AF 4F 31 40 BC 0F AC
0E40=EF 94 73 91 5F 97 F9 20 B7 87 FA E7 A7 F8 F3 AF
0E50=9C C6 1C 9C 5F 1F 8C 5F 82 A4 D0 31 58 92 BF F8
0E60=DB AF 02 5F 1F 14 D0 31 58 02 FE FE FE FE 5F 14
0E70=D0 31 58 EF 02 F1 5F 84 FB 24 32 00 C0 0D D7 92
0E80=BF F8 D9 AF 96 FA BF B6 39 92 96 F9 40 B6 14 D0
0E90=31 8A 02 FE FE FE FE 5F 14 D0 E2 0F F1 5F 1F 31
0EA0=8A 84 FB 36 3A 98 F8 10 BC F8 03 AC EC 2F 0F 73
0EB0=2F 0F 73 2F 0F 73 2F 0F 73 99 F9 08 B9 91 BC F8
0EC0=04 30 14 0F F1 5F 2F 31 8A 96 FA 40 3A DA 92 BC
0ED0=F8 F2 AC EC 1F 0F 73 2F 0F 73 14 D0 02 FA 07 39
0EE0=93 C8 39 9A 30 BD 31 EE 02 FB 0F C6 14 D0 F8 05
0EF0=A4 C0 0A 83 31 10 02 FB 0F 3A 10 F8 2B A4 D0 FF
0F00=80 10 20 02 40 04 08 01 7A 92 BC 8A F8 D6 AA 0A
0F10=FA 07 B3 3A 21 96 FA 08 32 21 2A 0A FD 02 CB 0E
0F20=1D 91 A0 F8 D7 AA 89 FA 10 3A B0 F8 E3 AC 4C 52
0F30=0C AC 02 BC 52 4A F7 3B 55 3A 43 8C 52 0A F7 3B
0F40=55 32 55 93 32 61 92 BC F8 E1 AC F8 10 5C 1C F8
0F50=04 5C F8 08 A0 0A AC 52 2A 0A BC F1 3A 64 1C 30
0F60=64 F8 24 A0 F8 D9 AA 9C 5A 1A 8C 5A F8 D3 AA 91
0F70=5A F8 E1 AA 4A BF 0A AF 1C 1C 1C 89 FA 01 F6 33
0F80=87 F8 08 1C 1C 1C 1C F9 E0 52 9C F1 5F 1F 8C 5F
0F90=1F 80 5F 1F 89 F6 33 A9 F8 10 BC 91 AC 4C 5F 1F
0FA0=4C 5F 1F 4C 5F 1F 4C 5F 1F F8 1A A4 F8 FF A0 D0
0FB0=1A 93 3A 46 F8 FC 30 AB 92 BC F8 D5 AC 4C FD 02
0FC0=3B 1E 0C F6 3B CB 89 F9 20 30 CE 89 F9 08 A9 96
0FD0=F9 40 B6 C0 0B 3A A8 48 3A E1 08 FE 33 E1 F8 C8
0FE0=5C 99 FA FC F9 04 B9 96 FA 20 32 F6 96 FA DF B6
0FF0=91 5C 2C F8 01 5C C0 07 08 EE EE EE EE 7F FF FF
```

What is claimed is:

1. A message communication system with message storage comprising:

transmitting means for developing and transmitting a binary encoded data train which has a message portion and a header preceding said message portion, said message portion including a plurality of characters, said header including, in the order stated, a plurality of synch signals, a first control signal following said synch signals to mark the end of said plurality of synch signals, a selected number of address signals immediately following said first control signal, said first control signal being further interposed between each of said selected number of address signals in the event said header includes more than one of said selected number of address signals, a second control signal to mark the end of said selected number of address signals, and a message length signal having information of a total character count of said plurality of characters; and a plurality of personal receivers, each of said receivers including synch means responsive to said synch signals and operative to prepare each of said personal receivers for reception of said data train, address means responsive to said address signals for addressing one or more of said personal receivers for which message portion is intended defining an addressed personal receiver, said address means having first addressable means responsive to a particular one of said address signals for uniquely identifying a different one of said personal receivers and second addressable means responsive to other of said address signals for commonly identifying selected ones of said personal receivers and being programmable by said message portion, and message means for receiving and storing in said addressed personal receiver said message portion and selectively displaying said message portion in alphanumeric characters, said message means including a plurality of character storage locations, said message means in response to said message length signal further being for reserving a selected number of said character storage locations in said addressed personal receiver commensurate with said total character count.

2. A message communication system in accordance with claim 1 in which said second addressable means is responsive to a first selected address signal commonly identifying a first selected group of personal receivers.

3. A message communication system in accordance with claim 2 in which said second addressable means is responsive to further selected address signals, each of said further selected address signals commonly identifying a corresponding further selected group of personal receivers.

4. A message communication system in accordance with claim 1 in which said header further includes a message type signal containing selected instructions for said addressed personal receiver relative to the utilization of said message portion, and in which said personal receiver further includes message type means responsive to said message type signal and operative to utilize said message portion in accordance with the instructions set forth in said message type signal.

5. A message communication system in accordance with claim 4 in which one of said instructions contained in said message type signal is to store said message portion and in which said message type means, in response to said one of said instructions, stores said message portion in said message means.

6. A message communication system in accordance with claim 4 in which one of said instructions contained in said message type signal is to program said second addressable means and in which said message type means, in response to said one of said instructions, makes said second addressable means responsive to a selected address signal commonly identifying a selected group of personal receivers.

7. A message communication system in accordance with claim 4 in which one of said instructions contained in said message type signal is to program said second addressable means and in which said message type means, in response to said instruction, makes said second addressable means nonresponsive to said selected address signal.

8. A message communication system in accordance with claim 4 in which said message type signal is disposed immediately preceding said message length signal.

9. A message communication system with message storage comprising:
transmitting means for developing and transmitting a binary encoded data train which has a message portion and a header preceding said message portion, said message portion including a plurality of characters, said header including, in the order stated, a plurality of synch signals, a first control signal following said synch signals to mark the end of said plurality of synch signals, a selected number of address signals immediately following said first control signal, said first control signal being further interposed between each of said selected number of address signals in the event said header includes more than one of said selected number of address signals, a second control signal to mark the end of said selected number of address signals, and a message length signal having information of a total character count of said plurality of characters; and
a plurality of personal receivers, each of said personal receivers including reception duty cycle means for sequentially activating each of said personal receivers for a first time period and deactivating each of said personal receivers for a second time period defining a duty cycle, said plurality of synch signals extending for a time period which is in excess of said second time period, synch means responsive to said synch signals and operative to prepare said personal receiver for reception of said data train, address means responsive to said address signals for addressing one or more of said personal receivers for which said message portion is intended defining an addressed personal receiver, said address means having first addressable means responsive to a particular one of said personal receivers and second addressable means responsive to other of said address signals for commonly identifying selected ones of said personal receivers and being programmable by said message portion, and message means for receiving and storing in said addressed personal receiver said message portion and selectively displaying said message portion in alphanumeric characters, said message means in response to said message length signal further being for reserving a selected number of characters storage locations in said addressed personal receiver commensurate with said total character count.

10. A message communication system in accordance with claim 9 in which said header further includes a drift signal containing information of the time remaining until the end of said data train and, in the event of the repeated transmission of said data train, the end of the last data train, and in which said receiver further includes control means responsive to said drift signal and operative to change the time period of at least one of said first time period and said second time period.

11. A message communication system with message storage in accordance with claim 10 in which said first time period is extended in accordance with said drift signal until reception of an acceptable data train is verified.

12. A message communication system in accordance with claim 10 in which said drift signal is disposed immediately following said message length signal.

13. A message communication system in accordance with claim 10 in which said control means is further responsive to said synch signals and operative to extend said first time period as long as said personal receiver receives synch signals for the reception of at least said first control signal.

14. A message communication system in accordance with claim 13 in which said control means is further responsive to said first control signal and operative to extend said first time period for the reception of said selected number of address signals.

15. A message communication system in accordance with claim 14 in which said first time period is extended for reception of said drift signal in the event said address means is nonresponsive to said selected number of address signals.

16. A message communication system in accordance with claim 15 in which said control means is further responsive to said drift signal and operative to terminate said first time period and extend said second time period for a time commensurate with said drift signal.

17. A message communication system in accordance with claim 14 in which said first time period is extended for reception of at least said message portion in the event said address means is responsive to one of said selected number of address signals.

18. A message communication system in accordance with claim 17 in which said control means is further responsive to said message length signal and operative to terminate said first time period after reception of said message portion.

19. A message communication system in accordance with claim 10 wherein said message portion includes a parity check signal disposed at the end of said message portion, said parity check signal containing information for determining the presence of errors in said message portion as received by said addressed personal receiver.

20. A message communication system in accordance with claim 19 in which said control means is further responsive to said parity check signal and operative to modify said time periods in accordance with the information derived from said parity check signal.

21. A message communication system in accordance with claim 20 in which said control means is operative to terminate said first time period in response to said parity check signal indicating the reception of an error free message portion.

22. A message communication system in accordance with claim 21 in which said second time period is extended in accordance with said drift signal.

23. A message communication system in accordance with claim 16, 17, or 22 in which said message length signal further includes information concerning the presence of an immediately following data train, and in which said drift signal further includes information of the time remaining until the end of said immediately following data train, and in which said control means is further responsive to said message length signal and operative to extend said first time period in accordance with said drift signal to assure reception of said immediately following data train.

24. A message communication system in accordance with claim 20 in which said control means is operative to extend said first time period in response to said parity check signal indicating the reception of an error containing message portion.

25. A message communication system with message storage in accordance with claim 24 in which said first time period is extended in accordance with said drift signal.

26. A message communication system in accordance with claim 10 in which said header further includes a message type signal containing selected instructions for said addressed personal receiver relative to the utilization of said message portion, and in which said personal receiver further includes message type means responsive to said message type signal and operative to utilize said message portion in accordance with the instructions set forth in said message type signal.

27. A message communication system in accordance with claim 26 in which said message type signal is disposed immediately preceding said message length signal.

28. A message communication system in accordance with claim 26 in which said message type signal further contains information of further header signals preceding said message portion.

29. A message communication system in accordance with claim 28 in which said header further includes at least one length of remaining header signal which contains information of the character count of said further header signals immediately following said length of remaining header signal.

30. A message communication system in accordance with claim 29 in which said length of remaining header signal further contains information concerning the presence of a further length of remaining header signal immediately following said further signals.

31. A message communication system in accordance with claim 30 in which said message length signal further contains information of the total character count of all further signals immediately following each of said length of remaining header signals.

32. A message communication system in accordance with claim 29 in which all signals of said header have a length of at least one byte.

33. A message communication system in accordance with claim 32 in which each byte is divided into a correction portion nibble and an information portion nibble.

34. A message communication system in accordance with claim 33 in which said address signal has a plurality of bytes.

35. A message communication system in accordance with claim 34 in which said address signal has at least eight bytes.

36. A message communication system in accordance with claim 33 in which said second control signal has a plurality of bytes.

37. A message communication system in accordance with claim 36 in which said second control signal has at least two bytes.

38. A message communication system in accordance with claim 37 in which each byte of said second control signal is identical to said first control signal.

39. A message communication system in accordance with claim 33 in which said message length signal has a plurality of bytes.

40. A message communication system with message storage in accordance with claim 39 in which said message length signal has at least three bytes.

41. A message communication system with message storage in accordance with claim 33 in which said drift signal has a plurality of bytes.

42. A message communication system in accordance with claim 41 in which said drift signal has at least three bytes.

43. A message communication system in accordance with claim 33 in which said length of remaining header signal has a plurality of bytes.

44. A message communication system in accordance with claim 43 in which said length of remaining header signal has at least two bytes.

45. A message communication system in accordance with claim 9 in which said transmitting means further develops and sequentially transmits a further binary encoded data train which includes said synch signals, said first control signal immediately following said synch signals, said second control signal immediately following said first control signal, a timing signal containing information of a third time period and a clocking signal containing information of the date and time of the transmission of said further data train.

46. A message communication system in accordance with claim 45 in which each of said personal receivers further includes out of range warning means for developing and displaying a warning message in the event said personal receiver is out of range of said transmitting means for a time period in excess of said third time period.

47. A message communication system in accordance with claim 46 in which said warning means includes a timer which is decremented upon said duty cycle means activating said personal receiver, said warning means being responsive to said timing signal and operative to set said timer in accordance with said timing signal.

48. A message communication system in accordance with claim 47 in which said third time period is at least as large as the total of all first and second time periods occuring between each sequential transmission of said further data train.

49. A message communication system in accordance with claim 48 in which said warning message is developed in the event said timer is decremented to a selected value.

50. A message communication system in accordance with claim 45 in which said message means is responsive to said clocking signal and operative to store said clocking signal for displaying the date and time preceding the displaying of said message portion received.

51. In a message communication system with message storage, a method comprising steps of:

developing a binary encoded data train having a header preceeding a message portion, said header including, in the order stated, a plurality of synch signals, a first control signal following said synch signals to mark the end of said plurality of synch signals, a selected number of address signals immediately following said first control signal, said first control signal being further interposed between each of said selected number of address signals in the event that header includes more than one of said selected number of address signals, a second control signal to mark the end of said selected number of address signals, and a message length signal having information of a total character count of a plurality of characters in said message portion;

transmitting said data train;

receiving in a plurality of personal receivers said synch signals to prepare each of said personal receivers for reception of said data train;

receiving in said plurality of personal receivers said first control signal, said selected number of address signals and said second control signal, and comparing said address signals to address codes in each of said personal receivers to determine which of one or more of said personal receivers said message portion is intended defining an addressed personal receiver said address codes having a first address code uniquely identifying a different one of said personal receivers and second address codes commonly identifying selected ones of said personal receivers and being programmable by said message portion;

receiving said message length signal in said addressed personal receiver and reserving character storage locations in said addressed personal receiver commensurate with said character count;

receiving said message portion in said addressed personal receiver and storing said message portion in said reserved character storage locations; and selectively displaying said message portion in alphanumeric characterics.

52. A method in accordance with claim 51 wherein said developing step includes developing a message type signal containing selected instructions for said addressed personal receiver relative to the utilization of said message portion; and said receiving said message portion step includes utilizing said message portion in accordance with said instructions.

53. A method in accorance with claim 52 wherein said utilizing step includes adding a selected address code contained in said message portion to said second address codes.

54. A method in accordance with claim 52 in which said utilizing step includes deleting a selected address code contained in said message portion from said second address codes.

55. A method in accodance with claim 52 wherein said developing instructions step is performed immediately prior to said developing of said message length signal in said header.

56. In a message communication system with message storage, a method comprising steps of:

developing a binary encoded data train having a header preceeding a message portion, said header including, in the order stated, a plurality of synch signals, a first control signal to mark the end of said plurality of synch signals, a selected number of address signals immediately following said first control signal, said first control signal being further interposed between each of said selected number of address signals in the event said header includes more than one of said selected number of address signals, a second control signal to mark the end of said selected number of address signals, and a message length signal having information of a total character count of a plurality of characters in said message portion;

transmitting said data train;

sequentially activating a plurality of personal receivers for a first time period and deactivating said personal receivers for a second time period defining a duty cycle, said plurality of synch signals extending for a time period which is in excess of second time period;

receiving in those personal receivers which are activated synch signals to prepare each of said activated receivers for a reception of said data train;

receiving in said prepared personal receivers said first control signal, said selected number of address signals and said second control signal and comparing said address signals to address codes in each of said personal receivers to determine which of one or more of said personal receivers said message portion is intended defining an addressed personal receiver, said address codes having a first address code uniquely identifying a different one of said personal receivers and second address codes commonly identifying selected ones of said personal receivers and being programmable by said message portion;

receiving said message length signal in said addressed personal receiver and reserving character storage locations in said addressed personal receiver commensurate with said character count;

receiving said message portion in said addressed personal receiver and storing said message portion in said reserved character storage locations; and selectively displaying said message portion in alphanumeric characterics.

57. A method in accordance with claim 56 wherein said developing step includes developing a drift signal containing information of the time remaining until the end of said data train and, in the event of the repeated transmission of said data train, the end of the last data train; and said receiving and said activated receiver step includes changing the time period of at least one of said first time period and said second time period in accordance with said drift signal.

58. A method in accordance with claim 57 wherein said receiving said message portion step includes extending said first time period in accordance with said drift signal until reception of an acceptable data train is verified.

59. A method in accordance with claim 57 in which said receiving said synch signal step further includes extending said first time period as long as said activated personal receivers receive such synch signals and for the reception of at least said first control signal.

60. A method in accordance with claim 59 wherein said extending step further includes extending said first time period for reception of said selected number of address signals after reception of said first control signal.

61. A method in accordance with claim 60 wherein said comparing step includes extending said first time period for reception of said drift signal in such of said personal receivers other than said addressed personal receiver.

62. A method in accordance with claim 61 which further includes extending said second time period for a time commensurate with said drift signal.

63. A method in accordance with claim 60 wherein said comparing step includes extending said first time period for a reception of at least said message portion in an addressed personal receiver.

64. A method in accordance with claim 63 wherein said receiving said message length signal includes terminating said first time period after reception of a number of characters of said message portion commensurate with said character count.

65. A message communication system in accordance with claim 62 or 63 wherein said developing step includes
- developing a further data train immediately following said first data train;
- instructing each of said activated receivers of said immediately following data train; and
- extending said first time period in accordance with information in said drift signal to assure reception of said immediately following data train, said drift signal further containing information until the time remaining until said end of said further data train.

* * * * *